(12) United States Patent
Kakutani

(10) Patent No.: US 8,964,231 B2
(45) Date of Patent: Feb. 24, 2015

(54) DEVICE CAPABLE OF EXTRACTING TWO-DIMENSIONAL CODE, AND METHOD AND PROGRAM THEREOF

(71) Applicant: Canon Kabushiki Kaisha, Tokyo (JP)

(72) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/174,189

(22) Filed: Feb. 6, 2014

(65) Prior Publication Data
US 2014/0153033 A1    Jun. 5, 2014

Related U.S. Application Data

(63) Continuation of application No. 13/483,341, filed on May 30, 2012.

(30) Foreign Application Priority Data

Jun. 8, 2011  (JP) .................................. 2011-128396

(51) Int. Cl.
*G06F 3/12*  (2006.01)
*G06F 21/46*  (2013.01)
(Continued)

(52) U.S. Cl.
CPC .............. *G06F 21/46* (2013.01); *G03G 21/046* (2013.01); *H04N 1/00846* (2013.01);
(Continued)

(58) Field of Classification Search
CPC ............ H04N 1/00846; H04N 1/0087; H04N 2201/327

USPC ...................... 358/1.18, 1.15, 1.13, 3.28, 474; 235/437, 375, 462.09

See application file for complete search history.

(56) References Cited

U.S. PATENT DOCUMENTS

| 6,356,704 B1 | 3/2002 | Callway et al. | |
|---|---|---|---|
| 8,130,407 B2 * | 3/2012 | Nose et al. ................... | 358/1.18 |

(Continued)

FOREIGN PATENT DOCUMENTS

| EP | 2317748 | 5/2011 |
|---|---|---|
| JP | H04-009963 | 1/1992 |

(Continued)

OTHER PUBLICATIONS

European Search Report, dated Oct. 8, 2012, issued by the European Patent Office, in European Patent Application No. 12004226.2.

(Continued)

*Primary Examiner* — Dennis Dicker
(74) *Attorney, Agent, or Firm* — Fitzpatrick, Cella, Harper & Scinto

(57) ABSTRACT

The present invention relates to a device having a first determining unit configured to determine whether version information included in a two-dimensional code included in an input image is version information that is supported by the device and a second determining unit configured to determine to prohibit printing of the input image when the included version information is determined to be version information that is not supported by the device or to determine whether to permit or prohibit printing of the input image based on information other than the version information included in the two-dimensional code when the included version information is determined to be version information that is supported by the device. With this arrangement, it is possible to execute processing in accordance with version information included in a two-dimensional code.

11 Claims, 25 Drawing Sheets

(51) Int. Cl.
*G03G 21/04* (2006.01)
*H04N 1/00* (2006.01)
*H04N 1/44* (2006.01)

(52) U.S. Cl.
CPC ...... *H04N 1/00867* (2013.01); *H04N 1/00875* (2013.01); *H04N 1/00877* (2013.01); *H04N 1/4413* (2013.01); *Y10S 283/902* (2013.01)
USPC ........ 358/1.15; 358/1.18; 358/3.28; 358/474; 358/1.13; 358/1.14; 235/437; 235/375; 358/462.09; 283/902

(56) References Cited

U.S. PATENT DOCUMENTS

| | | | |
|---|---|---|---|
| 8,247,240 | B2 | 8/2012 | Pien et al. |
| 8,274,709 | B2* | 9/2012 | Kakutani .................... 358/3.28 |
| 8,395,823 | B2* | 3/2013 | Kakutani .................... 358/3.28 |
| 8,437,049 | B2* | 5/2013 | Kakutani .................... 358/448 |
| 8,542,867 | B2* | 9/2013 | Sato et al. .................... 382/100 |
| 2003/0179412 | A1* | 9/2003 | Matsunoshita ............. 358/3.28 |
| 2006/0279785 | A1* | 12/2006 | Onishi et al. ................. 358/1.18 |
| 2007/0016962 | A1* | 1/2007 | Ishikura ......................... 726/31 |
| 2007/0071320 | A1* | 3/2007 | Yada ............................ 382/181 |
| 2008/0028221 | A1* | 1/2008 | Endo et al. .................... 713/176 |
| 2009/0268259 | A1 | 10/2009 | Kikuchi |
| 2010/0060923 | A1 | 3/2010 | Kakutani |
| 2010/0230493 | A1* | 9/2010 | Akiyama ..................... 235/437 |
| 2010/0231907 | A1 | 9/2010 | Pien et al. |
| 2010/0272193 | A1 | 10/2010 | Khan et al. |
| 2011/0032576 | A1 | 2/2011 | Kakutani |
| 2011/0304879 | A1 | 12/2011 | Kakutani |
| 2011/0317201 | A1 | 12/2011 | Kakutani |

FOREIGN PATENT DOCUMENTS

| | | |
|---|---|---|
| JP | H10-312447 | 11/1998 |
| JP | 2010-009139 A | 1/2010 |
| JP | 2010093774 A | 4/2010 |
| JP | 2011-092957 A | 4/2011 |

OTHER PUBLICATIONS

Japanese Office Action dated Dec. 24, 2014, in related Japanese Patent Application No. 2014-037053.

* cited by examiner

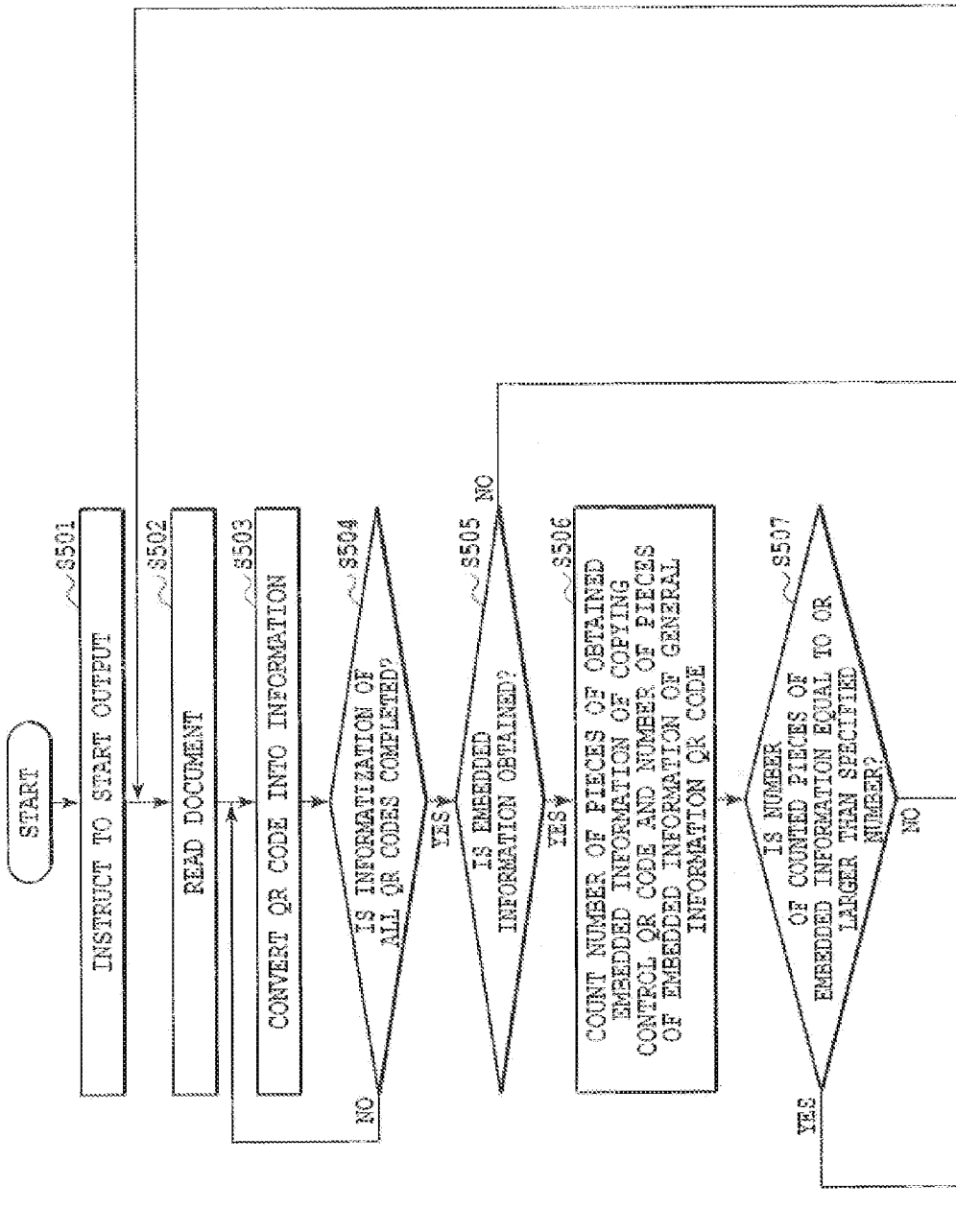

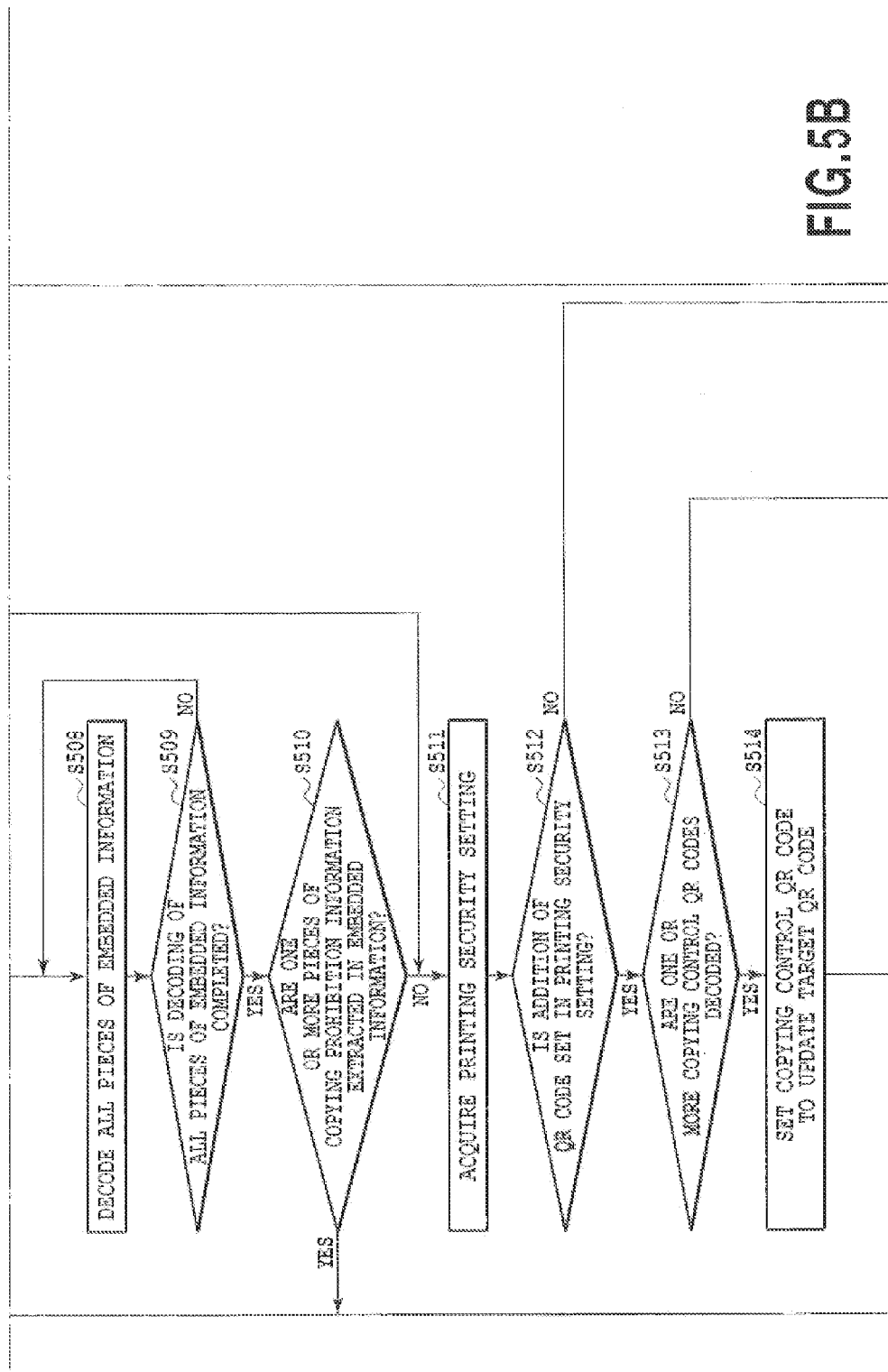

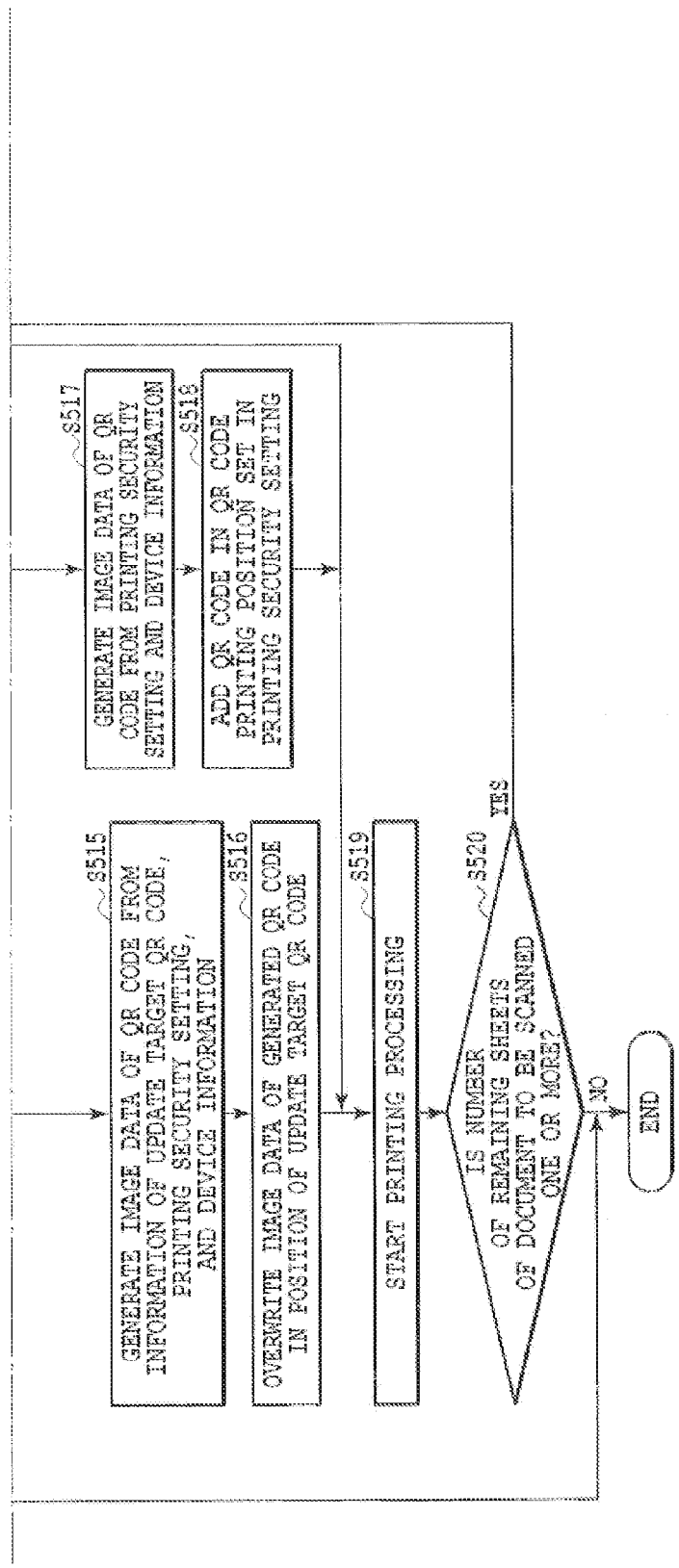

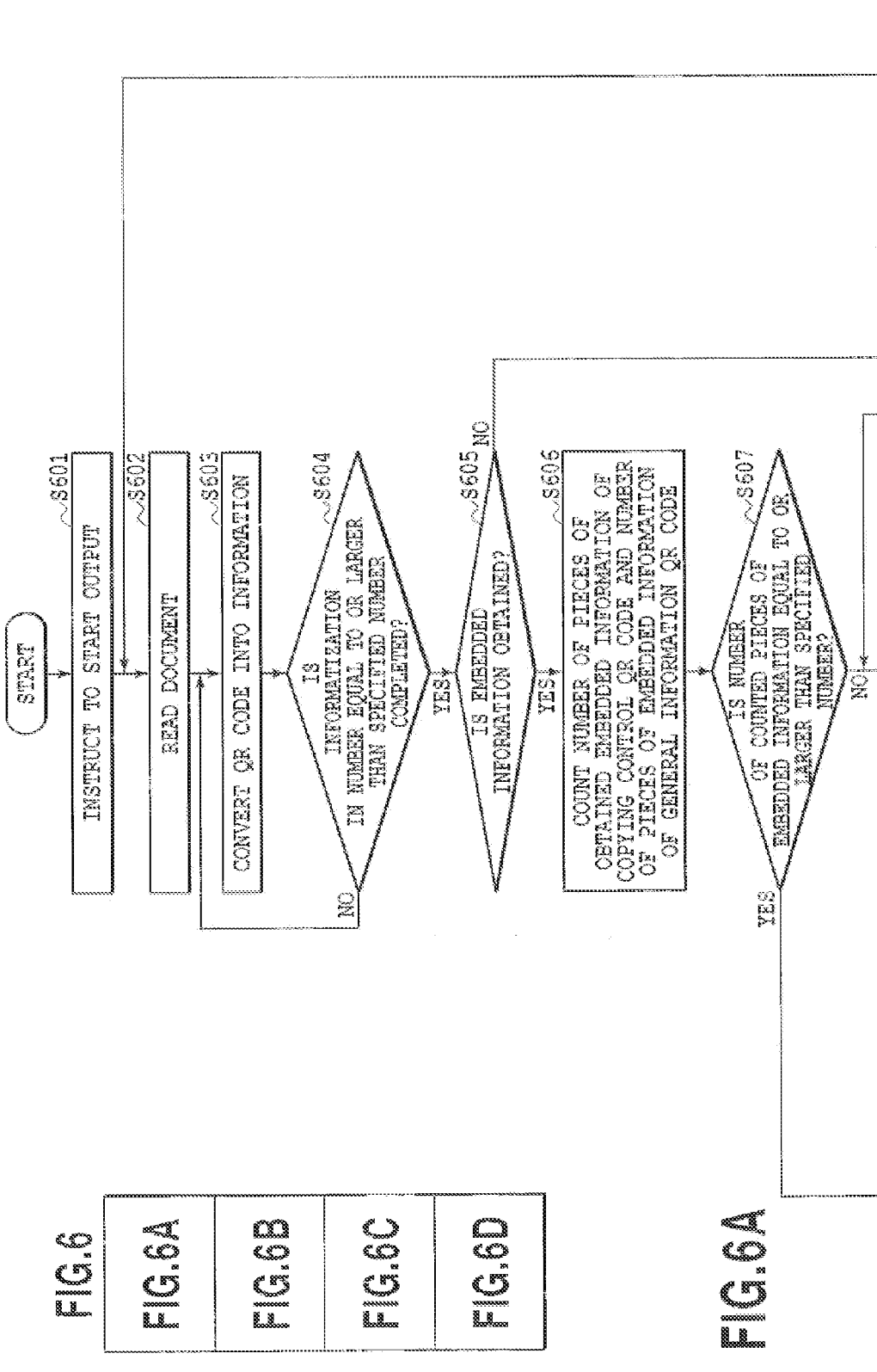

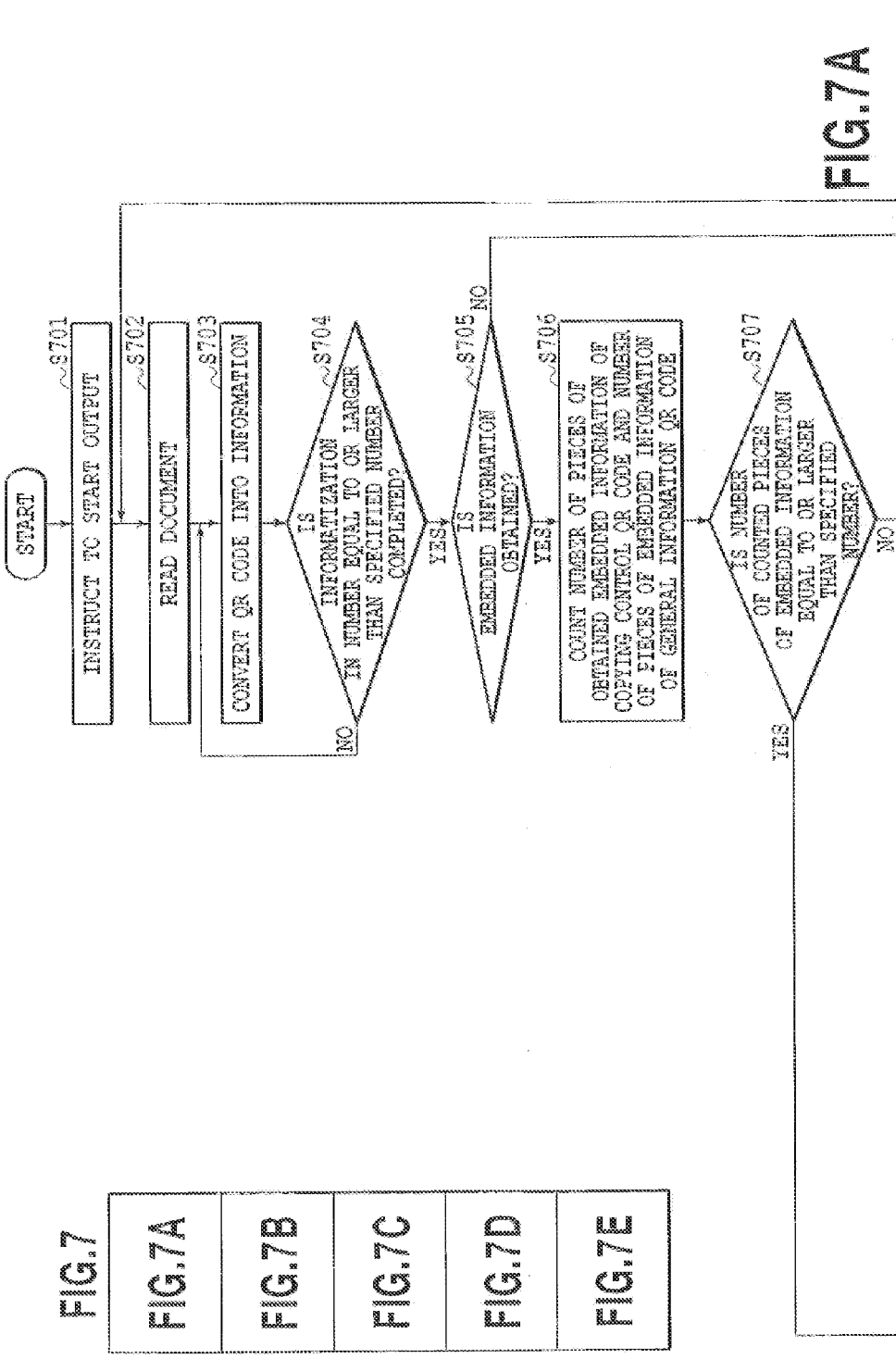

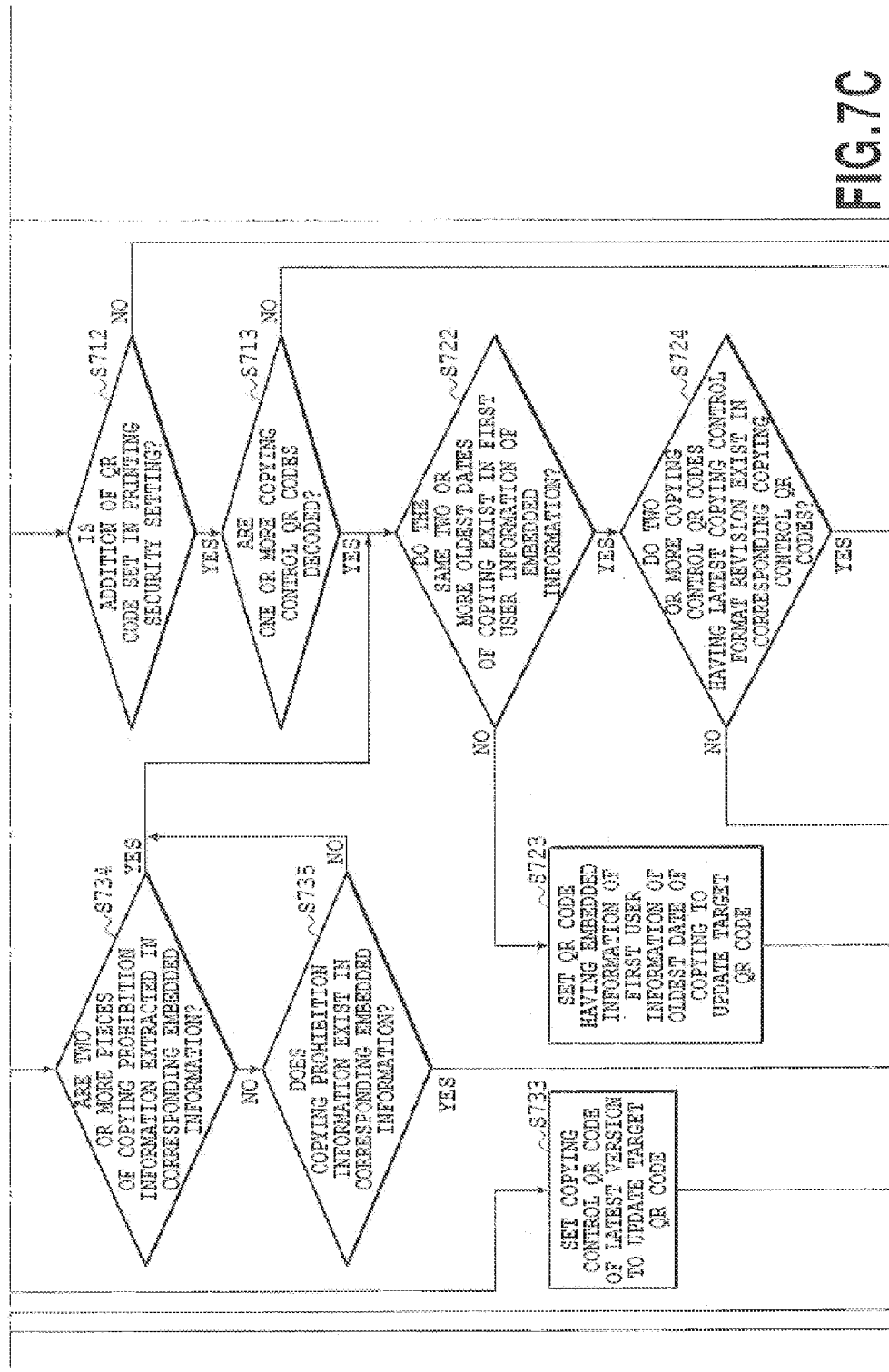

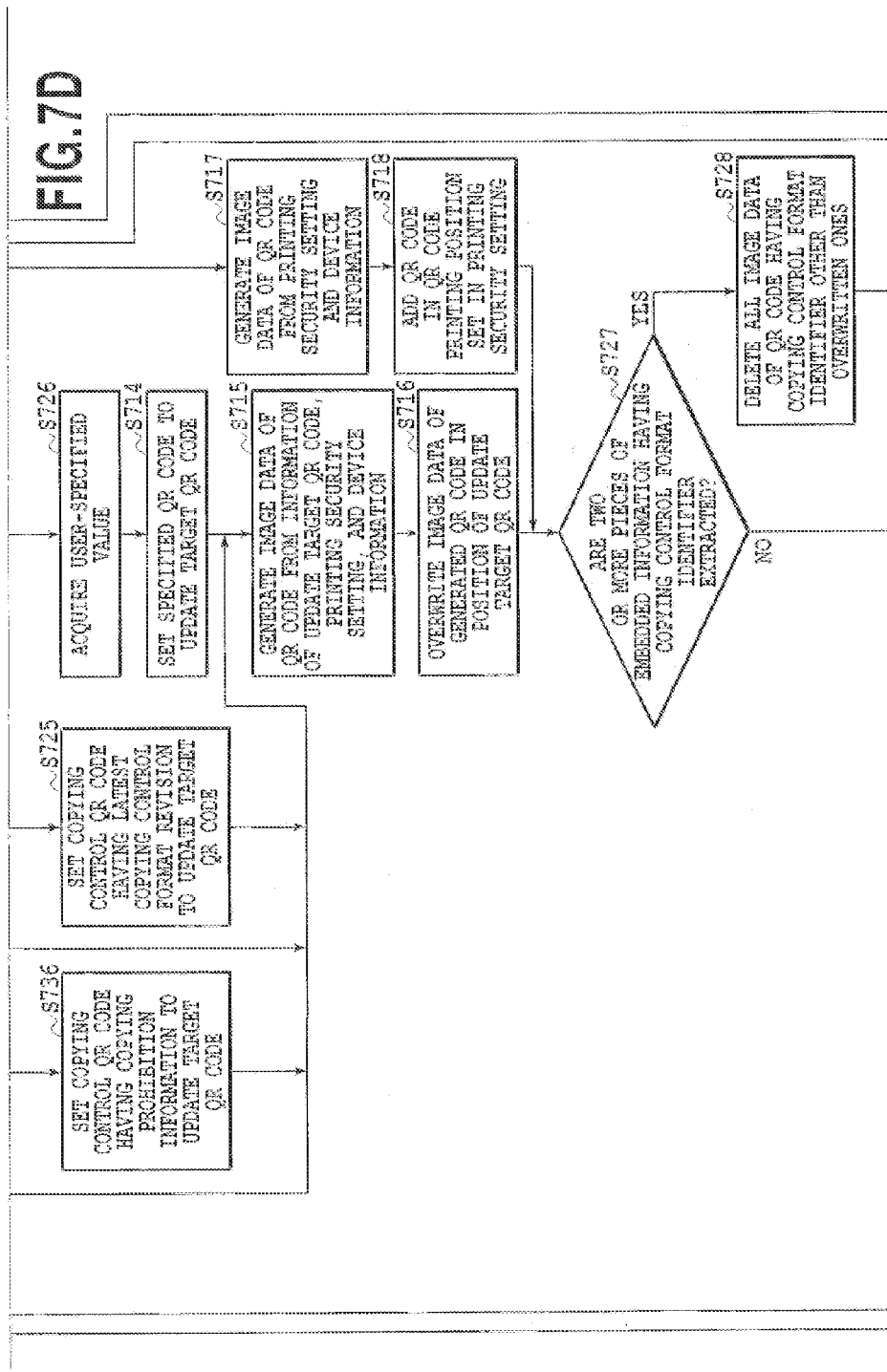

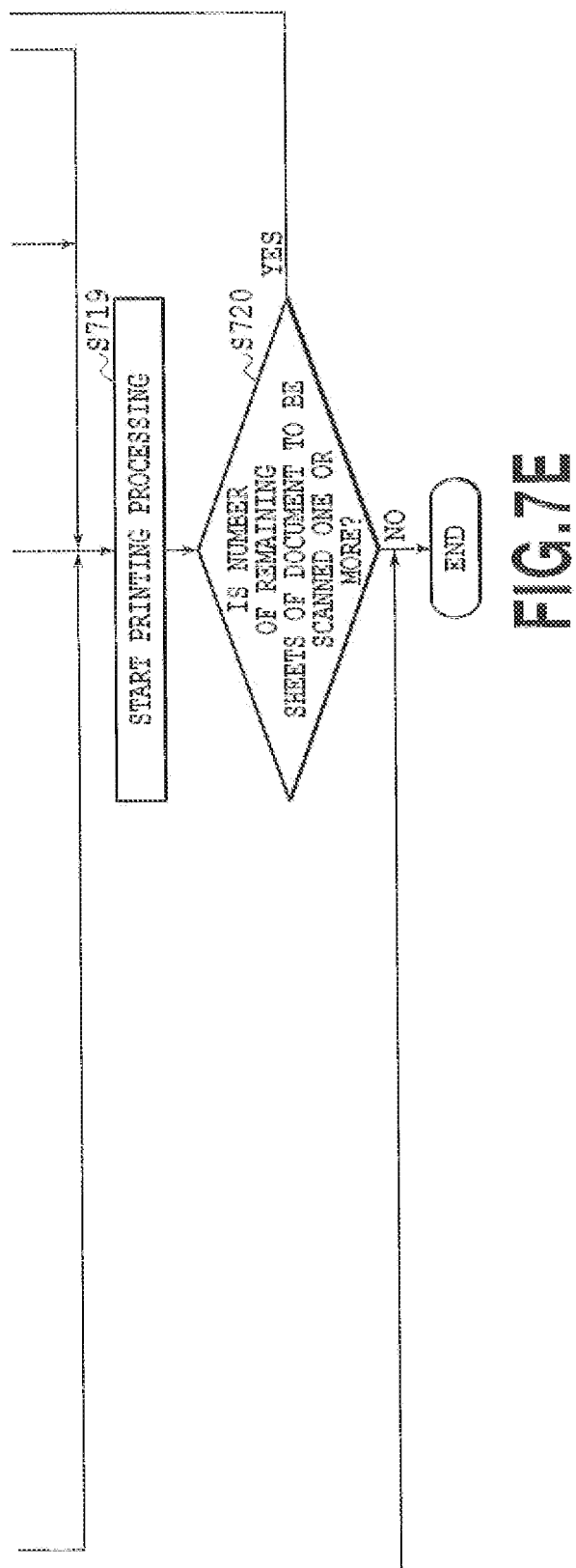

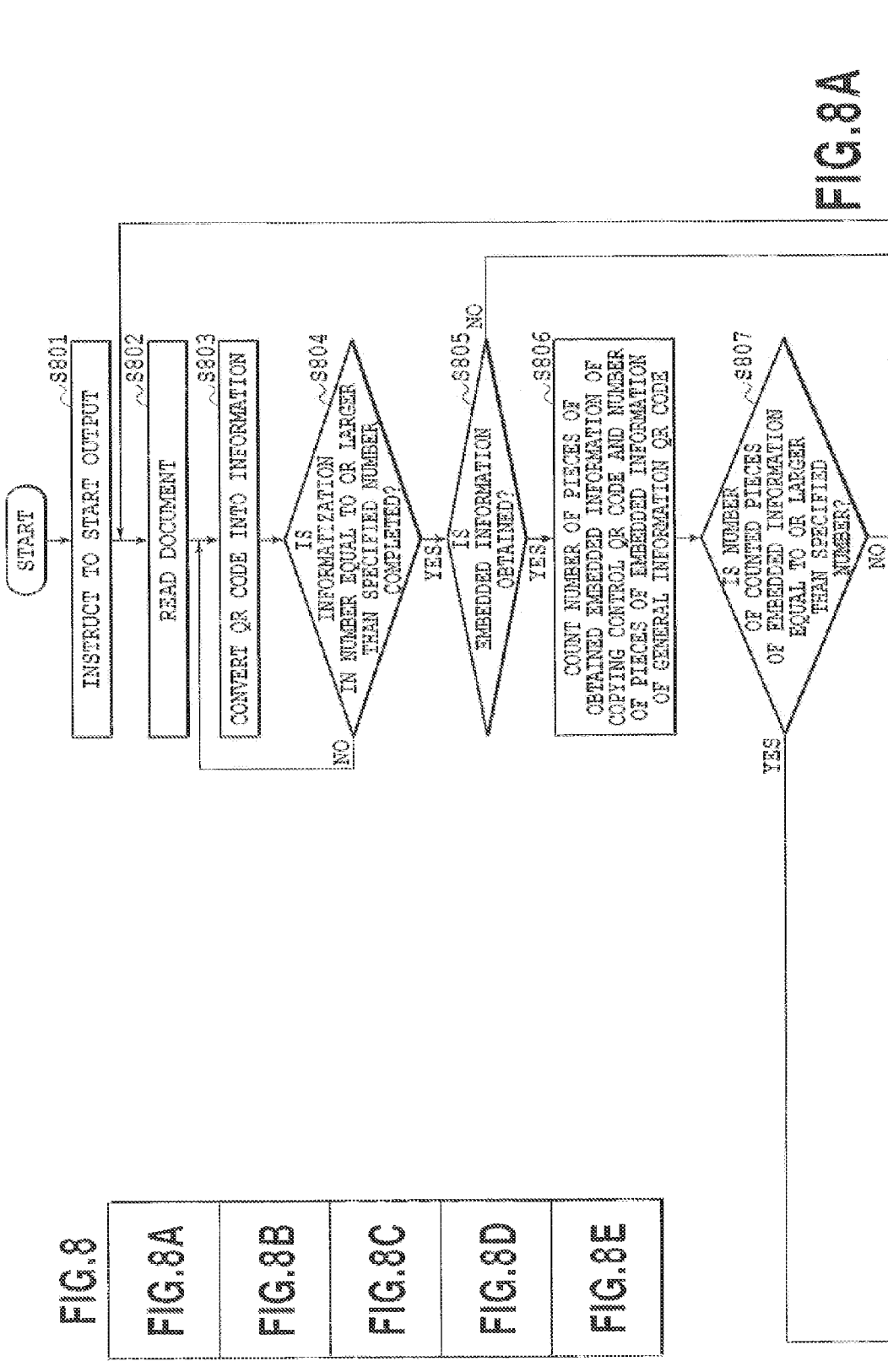

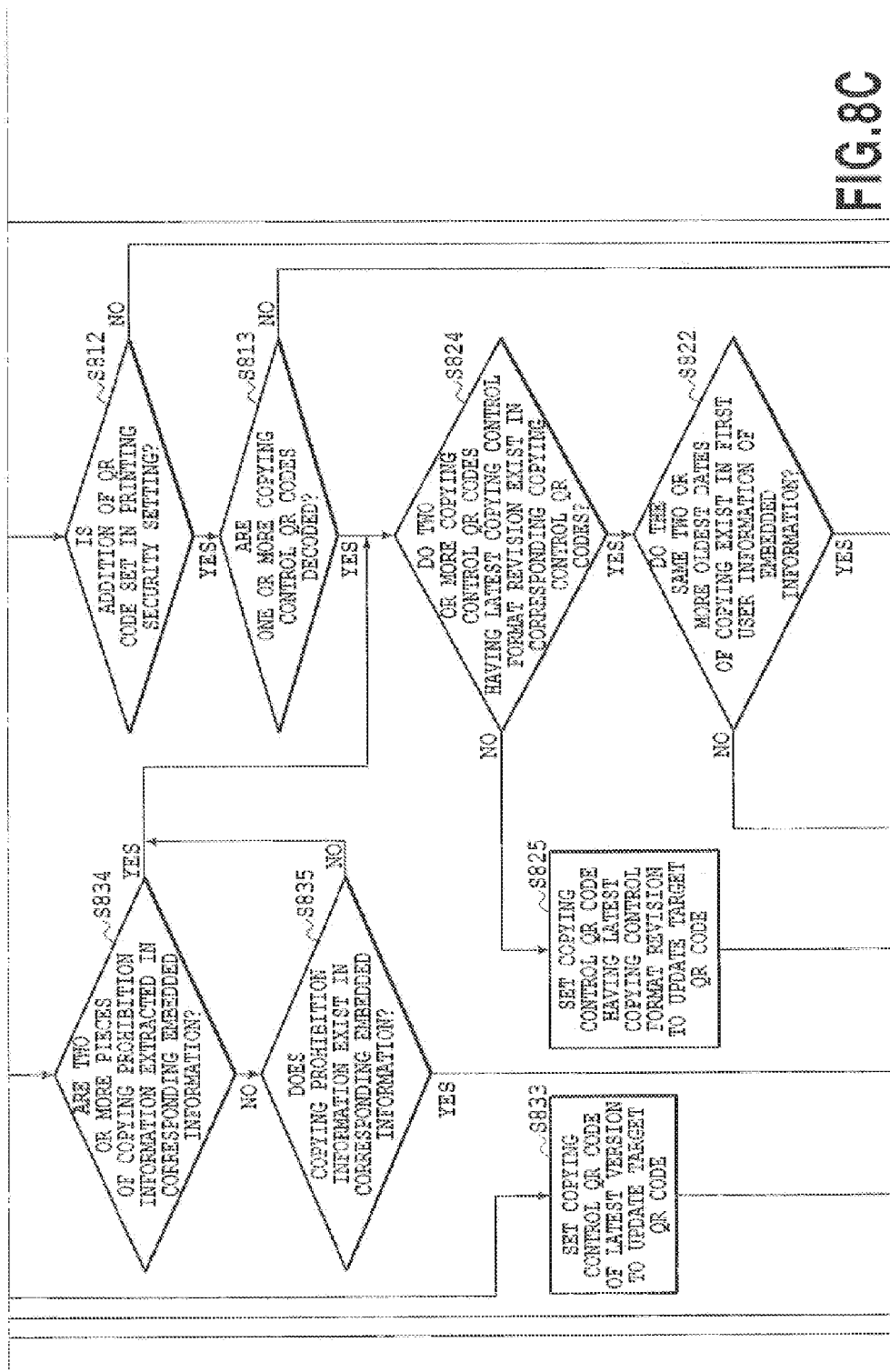

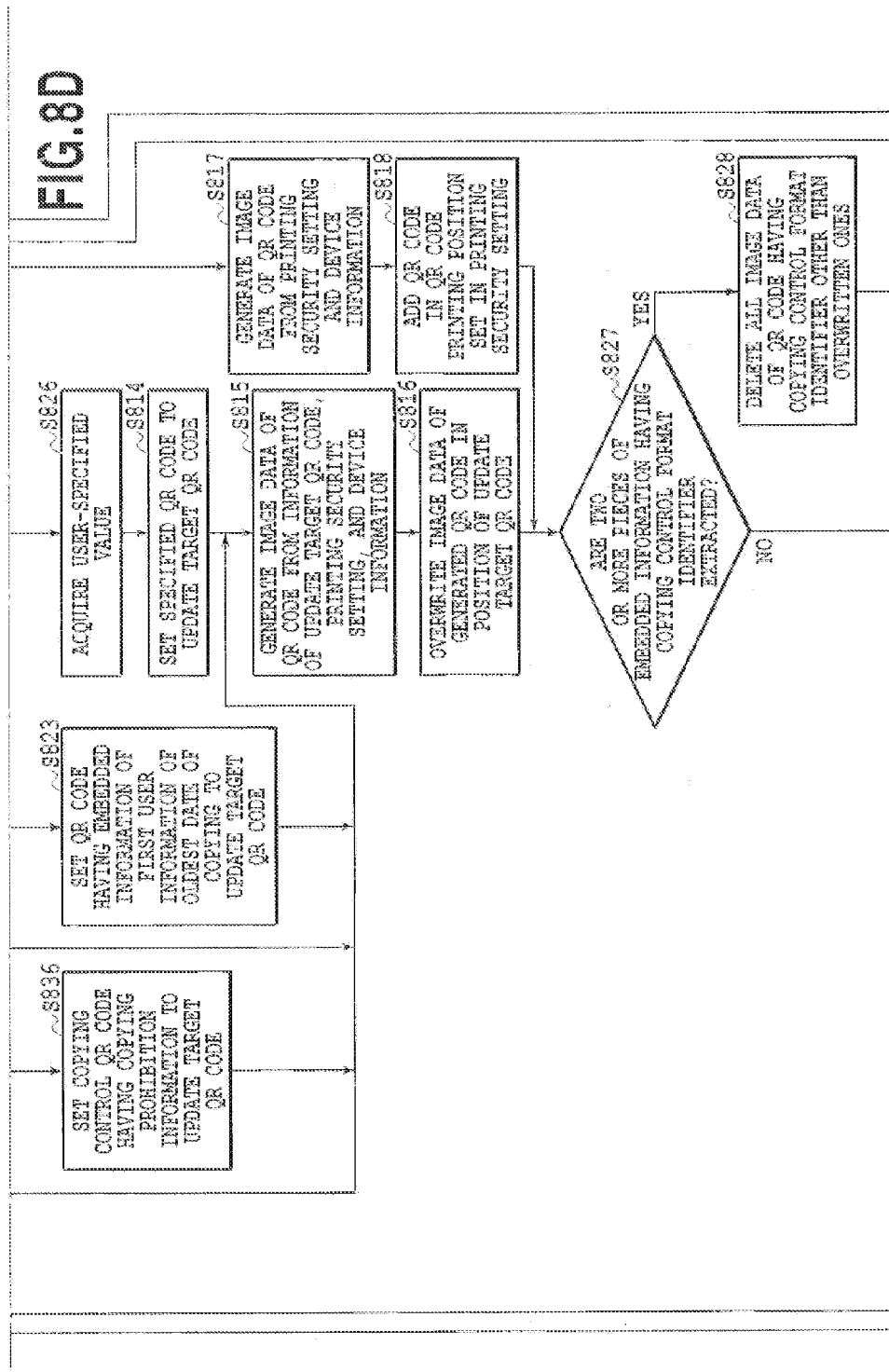

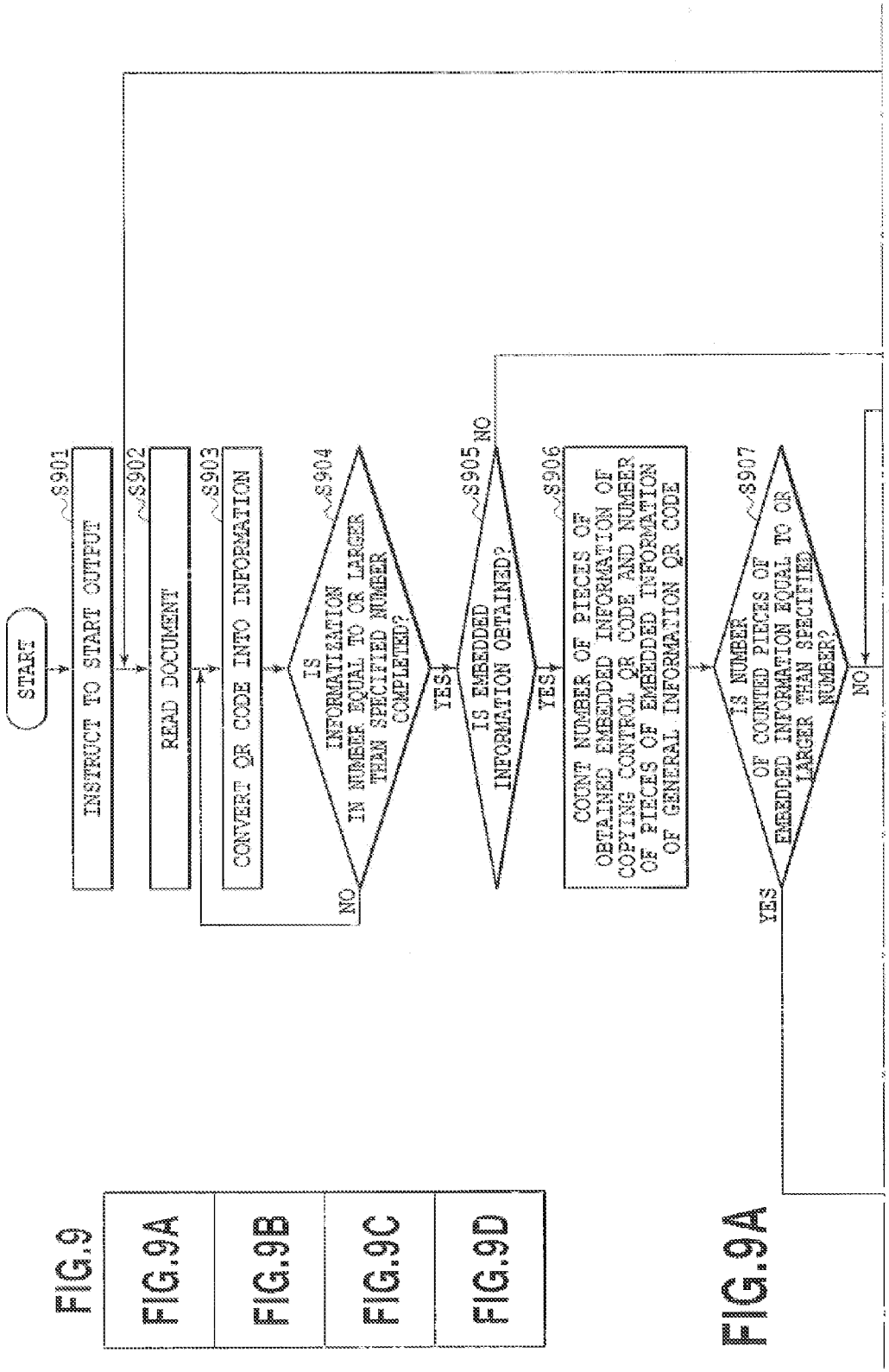

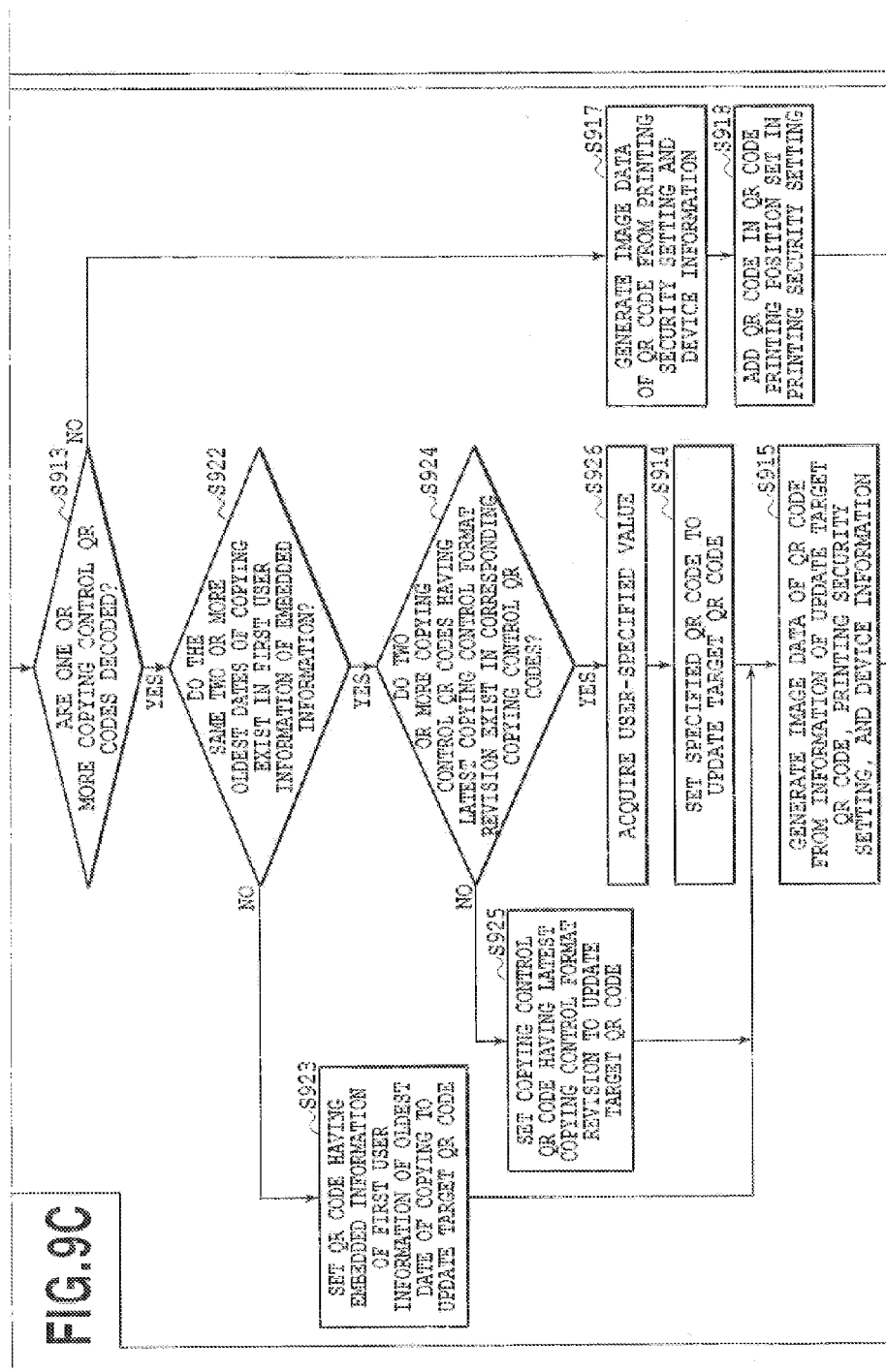

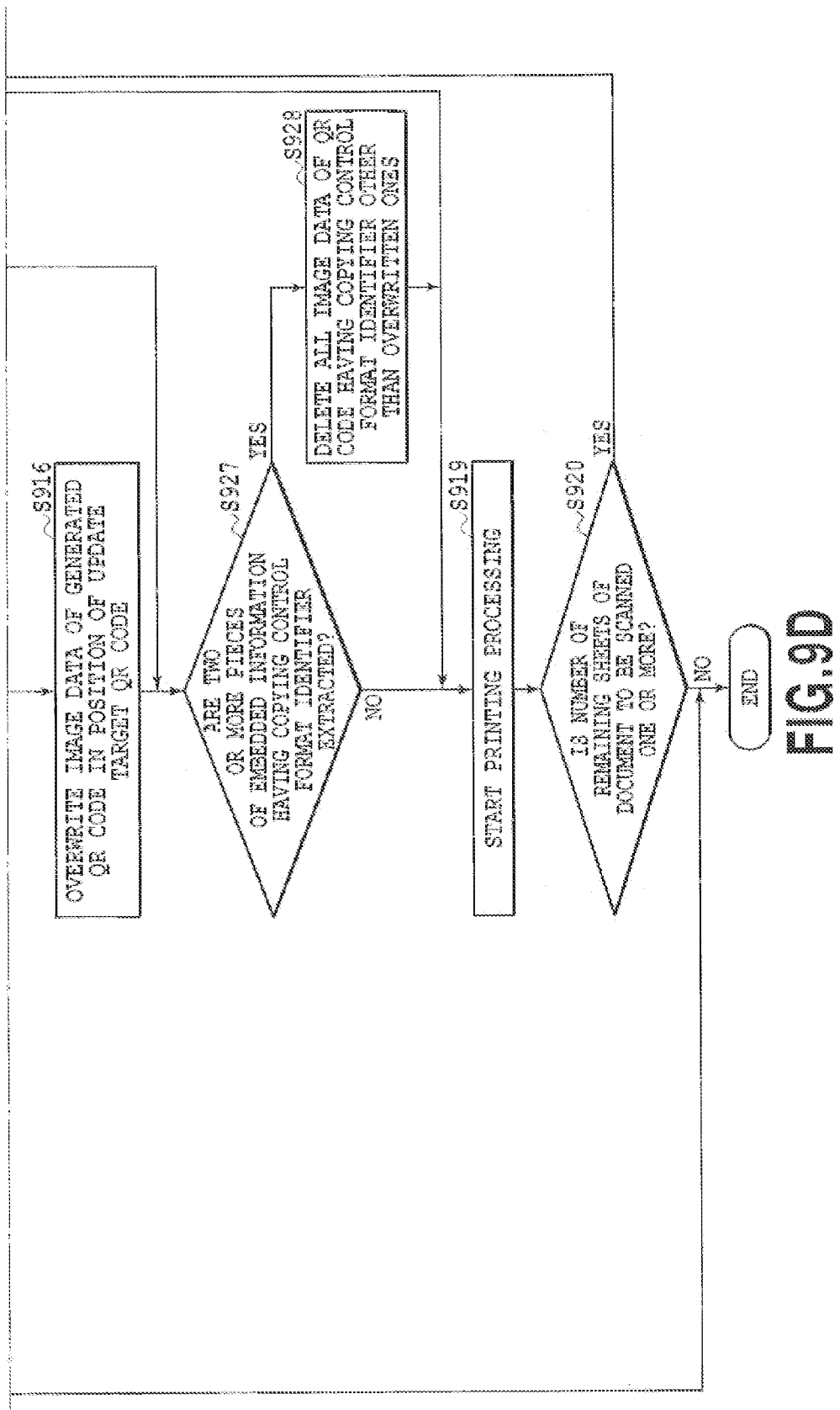

DEVICE CAPABLE OF EXTRACTING TWO-DIMENSIONAL CODE, AND METHOD AND PROGRAM THEREOF

BACKGROUND OF THE INVENTION

1. Field of the Invention

The present invention relates to a device capable of extracting a two-dimensional code, and a method and a program thereof.

2. Description of the Related Art

In recent years, the problems of unauthorized copying of a document have been increasing, as the digital multi function peripheral (MFP) spreads. As countermeasures against these problems, there are known techniques to suppress copying of a specific document. For example, the techniques to suppress copying of a document include the following.

For example, Japanese Patent Laid-Open No. H04-009963 (1992) discloses a method for prohibiting copying of a document when an MFP reads a document to which a two-dimensional code having copying prohibition information is added in advance.

In general, some MFPs have functions of storing into storage and outputting such as E-main transmission, FAX transmission, etc., in addition to the copying function, and when the MFP reads a document to which copying prohibition information is added, it is possible to prohibit output uniformly even if any output function is specified.

As a two-dimensional code to be embedded in a document, the QR code (registered trademark) as disclosed in Japanese Patent Laid-Open No. H10-312447 (1998) is known. The QR code is used more general-purposely compared to the two-dimensional code described in Japanese Patent Laid-Open No. H04-009963(1992). Consequently, there is a case where the QR code is used as a two-dimensional code and the QR code in which copying prohibition information is embedded is added to a document.

When an MFP interprets a two-dimensional code, it is supposed that data in the QR code includes a specific identifier determined in advance, a format indicating the arrangement of data (information), type information, such as a version indicating the type of the format and ID, etc.

There is a case where a plurality of two-dimensional codes in which copying control information of the copying operation, such as copying prohibition information and copying permission information, is added to a document to be copied in an image forming device. Further, there may be a case where a two-dimensional code in which control information of the copying operation is embedded and a two-dimensional code of the same kind but in which different information is embedded are added at the same time when a general-purpose two-dimensional code, such as the QR code, is used as a two-dimensional code.

This corresponds to, for example, a case where a two-dimensional code is added newly to a document to which another two-dimensional code has already been added, or a case where a plurality of documents is to be copied at a time and each individual document includes a different two-dimensional code. Further, there may be a case where version information indicating modifications of specifications is included in a two-dimensional code, and consequently, there exist mixedly various pieces of version information.

SUMMARY OF THE INVENTION

There exists no publicly-known technique that specifies handling of a document to which a two-dimensional code including control information of the copying operation and a two-dimensional code not including the control information of the copying operation are added. Further, there are no rules that specify a processing method when version information different for each two-dimensional code is included.

Therefore, the invention of the present application relates to control when a two-dimensional code in which control information of the copying operation is embedded and a two-dimensional code of the same kind, but not including the control information of the copying operation are to be copied at a time. Further, the invention of the present application relates to processing in accordance with the version included in the two-dimensional code.

In order to solve the above-mentioned problems, a device according to the invention of the present application includes: a first determining unit configured to determine whether version information included in a two-dimensional code included in an input image is version information that is supported by the present device; and a second determining unit configured to determine to prohibit printing of the input image when the included version information is determined to be version information that is not supported by the present device or to determine whether to permit or prohibit printing of the input image based on information other than the version information included in the two-dimensional code when the included version information is determined to be version information that is supported by the present device.

According to the present invention, it is possible to implement control that does not cause unauthorized operations when a two-dimensional code in which control information of the copying operation is embedded and a two-dimensional code not including the control information of the copying operation are read at a time. Further, processing in accordance with the version included in the two-dimensional code is performed.

Further features of the present invention will become apparent from the following description of exemplary embodiments (with reference to the attached drawings).

BRIEF DESCRIPTION OF THE DRAWINGS

FIG. 5 is a diagram showing the relationship of FIGS. 5A-5C;

FIGS. 5A-5C are a flowchart showing copying processing in a first embodiment;

FIG. 6 is a diagram showing the relationship of FIGS. 6A-6D;

FIGS. 6A-6D are a flowchart showing copying processing in a second embodiment;

FIG. 7 is a diagram showing the relationship of FIGS. 7A-7E;

FIGS. 7A-7E are a flowchart showing copying processing in a third embodiment;

FIG. 8 is a diagram showing the relationship of FIGS. 8A-8E;

FIGS. 8A-8E are a flowchart showing copying processing in a fourth embodiment;

FIG. 9 is a diagram showing the relationship of FIGS. 9A-9D; and

FIGS. 9A-9D are a flowchart showing copying processing in a fifth embodiment.

DESCRIPTION OF THE EMBODIMENTS

Figure 1:
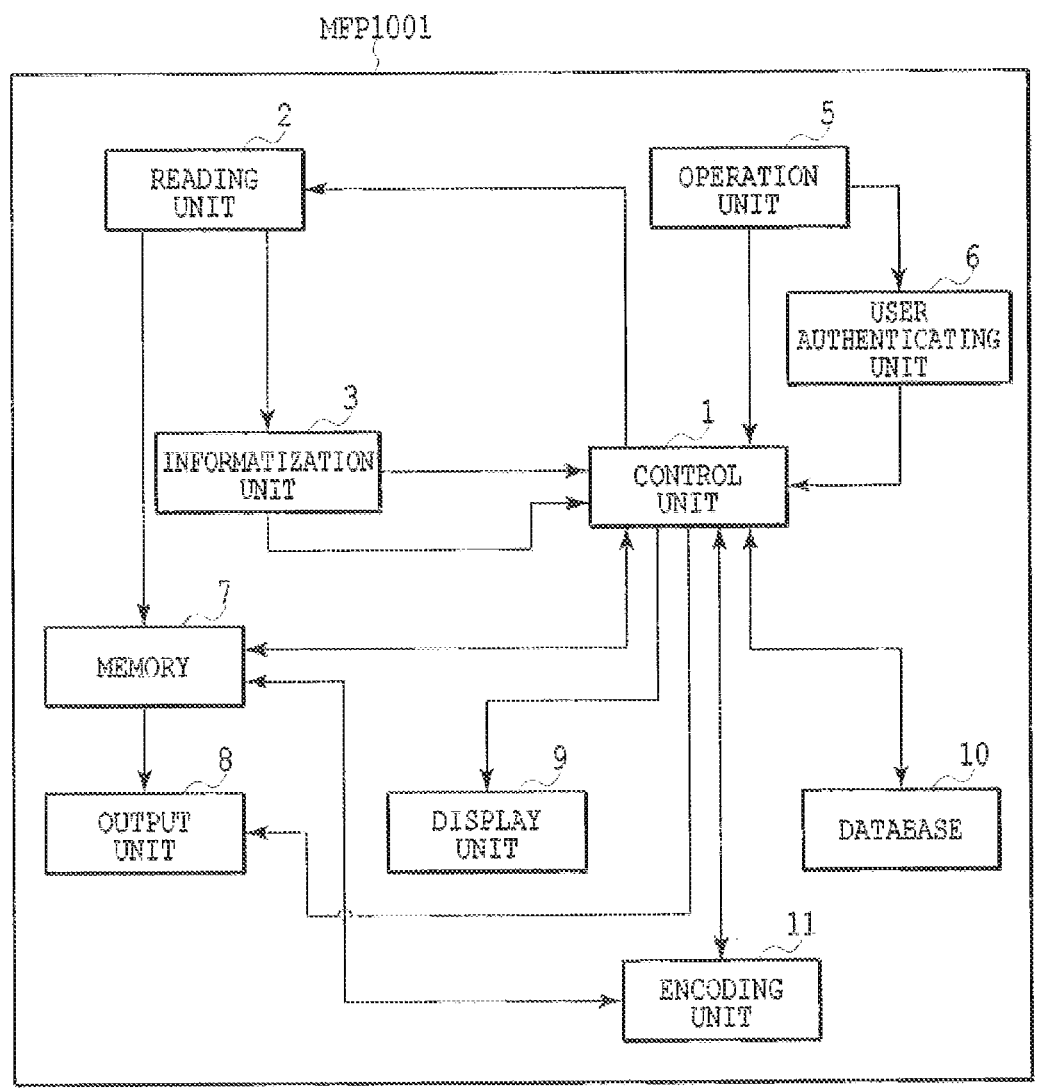
FIG. 1 is a block diagram showing a configuration of an MFP 1001 in an embodiment of the present invention.

Hereinafter, preferred embodiments of the present invention will be explained in detail based on the accompanying drawings.

First Embodiment

Ordinarily, only one kind of two-dimensional code having copying control information is embedded in a one-page document to be printed, or the two-dimensional code is used in such a manner that only one kind is located in a predetermined region. Consequently, when two-dimensional codes in the number larger than a specified number (predetermined number) are added to a scanned document, it can be supposed that the document is altered intentionally by a malicious user. The specified number is the number of two-dimensional codes determined in advance and set by a user or maker.

As an example, a malicious user will try to cause an MFP to perform unauthorized operation by causing the MFP to scan a number of two-dimensional codes of the same kind having no control information of the copying operation at a time in a document to be copied including control information of the copying operation.

Hence, in the first embodiment, copying is determined to be unauthorized copying by a user when the copying control information indicating an instruction about the copying operation and other pieces of information are generated in the number equal to or larger than the specified number from the two-dimensional code included in the document to be copied. Then, regardless of the contents of the instruction indicated by the copying control information included in the two-dimensional code, copying is prohibited.

In the present embodiment, as an example of the two-dimensional code included in a document to be scanned, a QR code is used. This is limited only to the present embodiment and it may also be possible to use a two-dimensional code other than the QR code.

First, terms used in the present embodiment will be explained.

To a document, a two-dimensional code including control information for causing an MFP to execute various kinds of control instructions is added. In the present specification, this control information is referred to as "copying control information". Copying control information includes two kinds of information: copying prohibition information and copying permission information.

It is possible for the QR code to include, in addition to copying control information, the name of a user who has instructed execution of copying, date of copying, MFP unique serial number, job, etc. In the present embodiment, information other than copying control information is referred to as "tracking information".

In the present embodiment, it is possible to store a plurality of, for example, two pieces of tracking information in one QR code. It is assumed that the MFP has the function to further add tracking information to the QR code.

In the present embodiment, an example is explained in which two pieces of tracking information are included in the QR code. Specifically, one of the two pieces of tracking information is tracking information including information about a user who has first instructed to add the QR code to a document image and information about the MFP that has performed copying based on the instruction. In the present embodiment, this tracking information is referred to as "first user information". The other is other tracking information including information about a user who has finally instructed to add the QR code to the document image and information about the MFP that has performed copying based on the instruction. In the present embodiment, the other tracking information is referred to as "final user information". More specifically, the tracking information may include the name of a user who has first instructed to add the QR code to a document and perform copying, the date of copying, the device name, the name of a user who has finally performed copying, the date of copying, and the device name.

In the present embodiment, in copying processing, even if a document image read optically from a document does not include a QR code, it is possible to newly generate a QR code, and add the new QR code to the document image if the MFP is configured to add tracking information.

When a document image includes a QR code and addition of tracking information is set, the current tracking information with which copying is performed is taken as final user information and a new QR code including first user information of the QR code included in the document image is generated. Then, in the document image, the QR code included in the document image is replaced with the new QR code. In the present embodiment, this is referred to as "update of QR code".

Tracking information may be embedded in one QR code together with copying control information, and this is not limited in particular.

A QR code including copying control information and tracking information has an identifier indicating that such information is included in the QR code or that the QR code has a region in which such information is stored. In the present embodiment, this identifier is referred to as a "copying control format identifier" or "copying control identifier". The copying control format identifier is further embedded in a QR code when both or one of copying control information and tracking information is embedded in the QR code.

In the present embodiment, it is assumed that "copying control information", "tracking information", and "copying control format identifier" are embedded in a QR code, respectively, as described above. In the present embodiment, a QR code in which such information is embedded is referred to as a "copying control QR code". On the other hand, a QR code in which such information is not included is referred to as a "general information QR code" in the present embodiment.

In the present embodiment, when there is a copying control format identifier in the embedded information of the QR code, the QR code is handled as a "copying control QR code" and when not, as a "general information QR code". Consequently, in the general information QR code, no copying control format identifier is embedded or the general information QR code is a QR code that cannot be interpreted by a copying machine even if copying control information is included.

Next, processing to create and copy a document image to which copying control information, tracking information, and a copying control format identifier are added is explained.

In the processing, firstly, the copying control information, the tracking information, and the copying control format identifier are encoded to generate embedded information. Secondly, the embedded information is converted into an image to generate a two-dimensional code. Thirdly, the generated two-dimensional code and the read document image are combined to generate a new document image to which the two-dimensional code is combined. Finally, the new document image to which the two-dimensional code is combined is to be printed.

By the above processing, the document image to which the copying control information, the tracking information, and the copying control format identifier are added as a two-dimensional code is copied and printed. It is assumed that processing to encode the copying control information, the tracking information, and the copying control format identifier and form an image thereof is referred to as "two-dimensional code generation".

In the present embodiment and the subsequent embodiments, processing at each step is explained using an aspect in which a two-dimensional code is used as described above (that is, an aspect in which a two-dimensional code is combined to a document image and printed and an aspect in which the document obtained by the printing is read and copying is controlled) as an example.

In the present embodiment, a QR code, which is one of general-purpose two-dimensional codes, is used as a two-dimensional code and it is assumed that a QR code is added to one sheet (one page) of a document.

Next, processing to extract copying control information from a document to which a QR code including copying control information and tracking information is added is explained.

Firstly, by optically reading a document placed on a platen or ADF (Auto Document Feeder), a document image is generated. In this manner, one document image corresponding to one page of the document is generated. Secondly, by analyzing the document image, a QR code is found. Thirdly, by converting the QR code that is found into information, embedded information is obtained. Fourthly, by decoding the embedded information, the copying control information, the tracking information, and the copying control format identifier are obtained. Thereby, it is possible to obtain copying control information from the document to which the copying control information is added as a QR code. Of the series of processing, the second and subsequent processing is referred to as "extraction" of information.

In general, embedded information includes an error correction code while the copying control information, the tracking information, and the copying control format identifier include no error correction code.

In the present embodiment, it is assumed that when an MFP 1001 obtains embedded information from a copying control QR code, the embedded information is stored within the MFP 1001 as a log.

Next, with reference to FIG. 1, a configuration of the MFP 1001 in the first embodiment of the present invention is explained in detail. Here, FIG. 1 is a block diagram illustrating the configuration of the MFP 1001 according to the present embodiment.

A control unit 1 controls the operation of each unit of the MFP 1001. The control unit 1 includes a processing device, such as a CPU (Central Processing Unit). The control unit 1 decodes embedded information.

A reading unit 2 optically reads (for example, scanning) a document and generates a document image. While a document is a paper, such as printed matter, a document image is digital data including color information for reproducing the document.

An informatization unit 3 finds a QR code from a document image and converts it into information.

An operation unit 5 receives an input of instruction to the MFP 1001 from a user.

A user authenticating unit 6 retains information necessary when authenticating a user who uses the MFP 1001. Detailed operations of the user authenticating unit 6 are described later.

A memory 7 stores a document image.

An output unit 8 performs outputting to outside after reading the document image from the memory 7, such as printing a document image on a sheet and transmitting a document image to an external device. As an example of the external device, there is a PC etc. connected to the MFP 1001 via a network.

A display unit 9 displays an image for display on a screen in accordance with control of the control unit 1.

A database 10 records printing settings, use logs, etc., of the MFP 1001.

An encoding unit 11 performs encoding and informatization described above.

Next, a procedure performed by a user to add copying control information and processing performed by the MFP 1001 in accordance therewith are explained in detail.

A user who intends to add copying control information to a document first inputs a user ID and password via the operation unit 5 while viewing the setting screen displayed on the display unit 9.

The user ID and password input via the operation unit 5 are sent to the user authenticating unit 6, which compares the input user ID and password with retained information and determines whether the input password is an appropriate password.

When the password is determined to be an appropriate password as a result of the determination, the user authenticating unit 6 transmits the user ID and the authentication result indicating that the password is appropriate to the control unit 1.

The control unit 1 having received user ID and the authentication result indicating that the password is appropriate displays a checkbox on the display unit 9, via which to ask the user whether or not to add copying control information. When the user selects to add copying control information via the checkbox, the control unit 1 causes the display unit 9 to display a printing security setting dialog box 31 shown in FIG. 3.

The user can select via the operation unit 5 one of alternatives, "Prohibit copying" and "Permit copying", by checking a radio button 32 in the printing security setting dialog box 31. When the selected alternative is "Prohibit copying", copying prohibition information is added to the document to be printed as copying control information as a result. On the other hand, when the selected alternative is "Permit copying", copying permission information is added to the document to be printed as copying control information as a result.

Further, the user selects one of "Add tracking information" and "Not add tracking information" by checking a radio button 37 in the printing security setting dialog box 31 via the operation unit 5. When the selected alternative is "Add tracking information", tracking information is added to the QR code as a result.

In the present embodiment, a user is allowed to select addition of tracking information, however, it may also be possible to set addition of tracking information in advance without user's selection. That is, it is possible to set so that tracking information is added when copying control information of the radio button 32 is selected.

Figure 3:
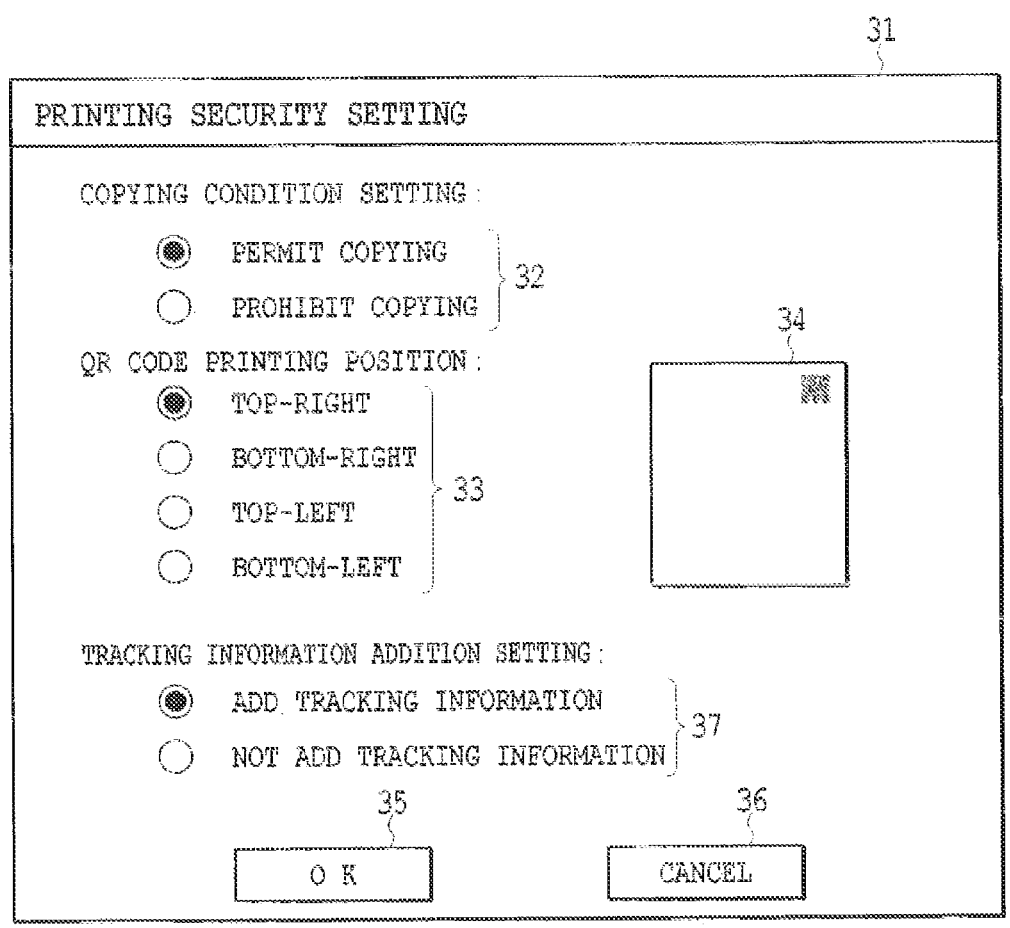
FIG. 3 is a diagram showing an example of a screen of printing security setting.

Furthermore, the user may set the position of the QR code to be added to the document image by checking a radio button 33 in the printing security setting dialog box 31 via the operation unit 5. In the present embodiment, it is possible to select one of alternatives, that is, "Top-right", "Bottom-right", "Top-left", and "Bottom-left", for the document. Regarding the selected position, it is also possible to display on a setting confirmation screen 34 an example of a document image including the QR code added at the selected position. For example, the setting confirmation screen 34 in FIG. 3 shows an example when "Top-right" is selected.

To all the document images created by a series of copying, the same copying control information is to be added. Here, a series of copying means the whole processing of copying so as to generate copied matter of a group of documents placed on a platen or ADF by a one-time copy instruction.

For example, when a user places a group of documents (for example, four sheets) on the ADF and instructs the MFP 1001 to produce three copies, three copies (that is, 12 sheets in total) are generated by a series of copying. Then, to all the three copies, the same copying control information and tracking information are added.

It is also possible to configure so that an input instruction to add copying control information and tracking information is given from a driver or utility of a PC connected with the MFP 1001. In the first embodiment of the present invention, the copying control information added to one sheet of document is one of copying prohibition information and copying permission information.

Figure 2:
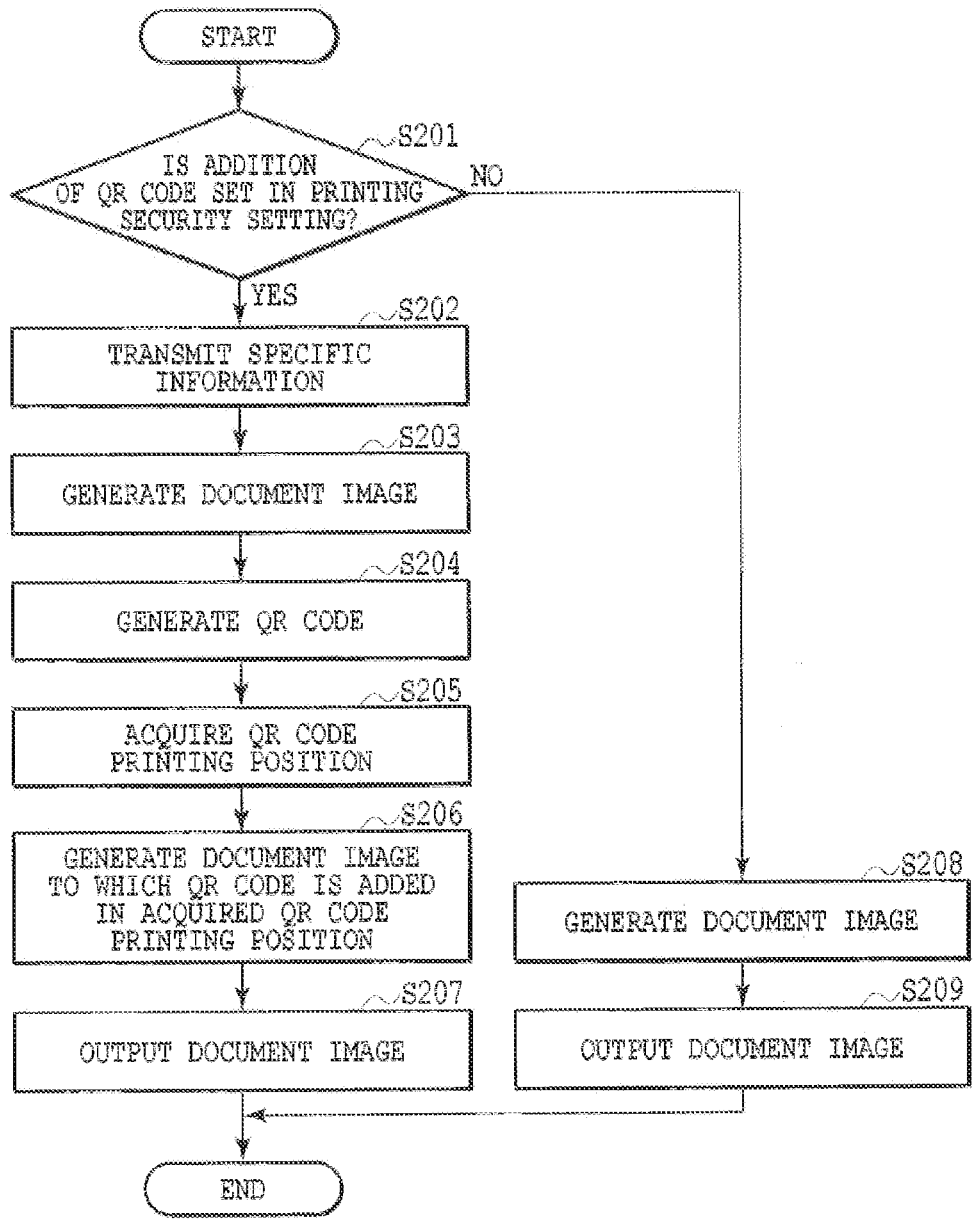
FIG. 2 is a flowchart showing creation processing of a document image to which a QR code is added of the MFP 1001.

Next, a method for creating a document image in which a QR code is embedded is explained in detail with reference to FIG. 2.

When processing starts, the control unit 1 first determines whether addition of QR code is set in the printing security setting (S201).

When determining that addition of QR code is set in the printing security setting in S201, the control unit 1 receives from the operation unit 5 information indicating the selection made by a user via the printing security setting dialog box 31. Then, the control unit 1 transmits copying control information in accordance with the selection to the encoding unit 11 (S202). As described above, when the selected alternative is "Prohibit copying", the copying control information in accordance with the selection includes copying prohibition information as a result. When the selected alternative is "Permit copying", the copying control information in accordance with the selection includes copying permission information as a result.

Next, the reading unit 2 reads a document to generate a document image and transmits the document image to the memory 7 and the informatization unit 3 (S203).

Next, the encoding unit 11 generates a QR code by encoding and converting the copying control information into an image. Further, the encoding unit 11 transmits the QR code to the memory 7 (S204).

Next, the control unit 1 acquires the position for arranging the QR code instructed by the user in the printing security setting (S205).

Next, when detecting that the memory 7 has received the QR code and the document image, the control unit 1 combines the QR code to the document image in the instructed position in the memory 7 and generates a document image to which the QR code is combined (S206).

Figure 4:
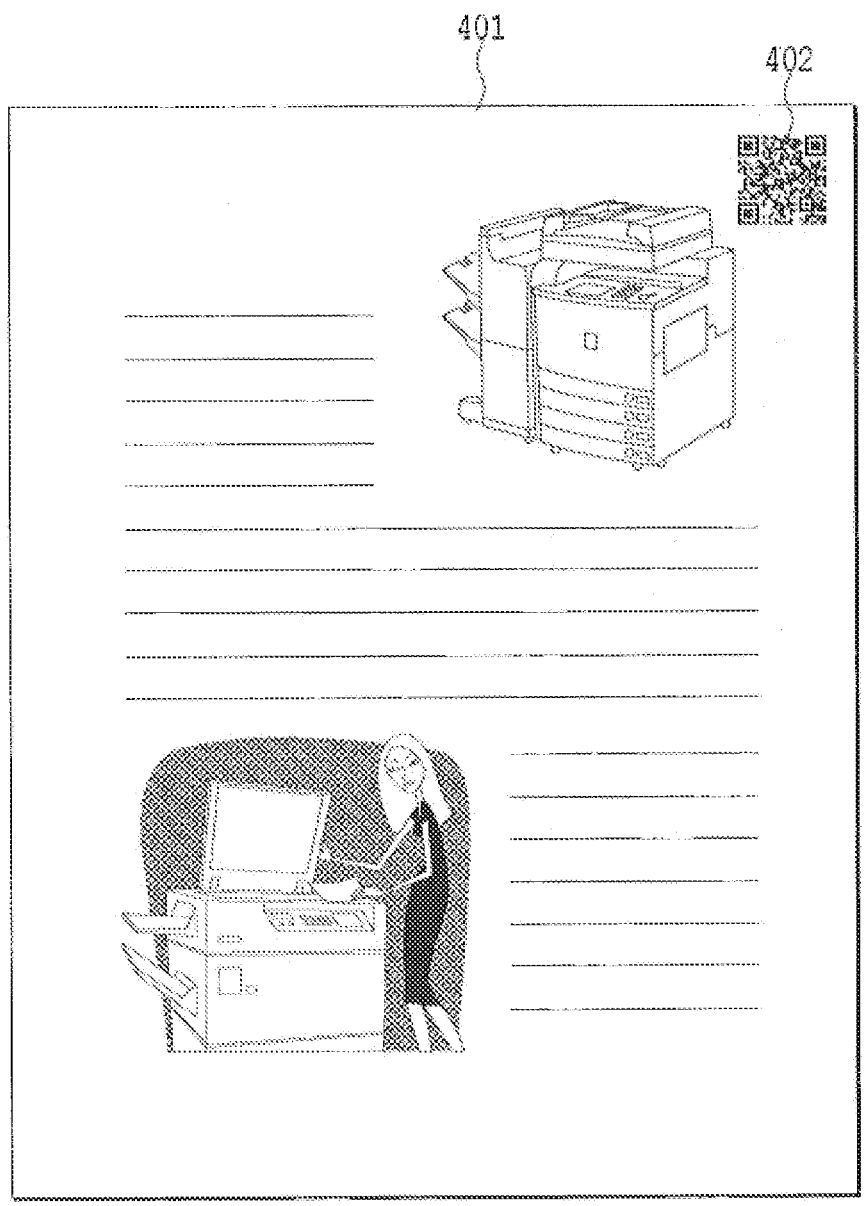
FIG. 4 is a diagram showing an example of a document image to which a QR code is added.

FIG. 4 is an example of a document image to which a QR code is combined. As shown in FIG. 4, a QR code 402 having copying control information is added to a document image 401.

Next, the control unit 1 transmits the document image to which the QR code is combined to the output unit 8 from the memory 7 and causes the output unit 8 to output the document image to which the QR code is combined (S207). A method of the output unit 8 to output a document image to which a QR code is combined, for example, includes printing of the document image to which the QR code is combined.

When it is determined that addition of QR code is not set in the printing security setting in S201, the reading unit 2 reads a document to generate a document image and transmits the document image to the memory 7 (S208).

Next, when detecting that the memory 7 has received the document image, the control unit 1 transmits the document image to the output unit 8 from the memory 7 and causes the output unit 8 to output the document image (S209).

Next, processing to extract copying control information from a document image will be explained.

First, the informatization unit 3 detects a cut-out symbol (finder pattern) located in the corner of the QR code in the document image. When detecting the finder pattern, the informatization unit 3 determines whether the document image includes a QR code. This is referred to as "finding of QR code". Next, the informatization unit 3 obtains embedded information by converting the found QR code into information. Then, finally, the control unit 1 having found one QR code decodes embedded information included in the QR code. By performing decoding in this manner, the control unit 1 may obtain copying control information. The QR code used in the present embodiment is a general QR code, and therefore, detailed contents and procedure of the decoding processing are omitted.

The series of processing described above, that is, the processing to find a QR code from a document image, the processing to obtain embedded information by converting the QR code that is found into information, and the processing to obtain copying control information by decoding the embedded information, is referred to as "extraction processing". By the extraction processing, it is possible to obtain copying control information from a document image.

Next, copying processing performed by the MFP 1001 having a function to prevent unauthorized copying will be explained in detail with reference to FIG. 1 and FIGS. 5A-5C.

First, a user inputs an instruction to start copying processing via the operation unit 5 (S501). The operation unit 5 informs the control unit 1 of the instruction to start copying processing.

The control unit 1 controls the reading unit 2 to read a document. A document image generated by this is transmitted to the memory 7 and the informatization unit 3 (S502). When the memory 7 receives the document image, the control unit 1 starts execution of image processing (for example, half toning etc.), which is necessary for the output unit 8 to perform printing, on the document image.

The informatization unit 3 finds a QR code included in the document image, converts the QR code that is found into information, and obtains embedded information (S503).

The processing at S503 is performed N times (for example, five times), and therefore, there is a possibility that up to N pieces of embedded information are obtained.

Next, the control unit 1 queries the informatization unit 3 whether informatization of the QR code performed in step S503 is completed (S504). When the informatization of the QR code is not completed yet, the process returns to processing of step S503.

When the informatization unit 3 completes the informatization of all the QR codes in step S504, the control unit 1 determines whether the informatization unit 3 obtains at least one piece of embedded information from the document image by the informatization of the QR code (S505).

When the informatization unit 3 obtains no embedded information from the document image in step S505, the process proceeds to processing of step S511.

When the informatization unit 3 obtains at least one piece of embedded information from the document image in step S505, the control unit 1 counts the number of pieces of obtained embedded information of the copying control QR code and the number of pieces of embedded information of the general information QR code (S506). At this time, the embedded information from which the copying control format identifier is obtained is counted as the number of pieces of embedded information of the copying control QR code and the embedded information other than that is counted as the embedded information of the general information QR code.

Next, the control unit 1 determines whether or not the number of counted pieces of embedded information is equal to or larger than a specified number (S507).

When determining that the number of counted pieces of embedded information is not equal to or larger than the specified number in step S507, the control unit 1 decodes the obtained embedded information (S508). Then, when the embedded information of the copying control QR code is obtained from the document, that is, when the copying control format identifier is obtained, the control unit 1 obtains copying control information and tracking information. There is a possibility that either of copying prohibition information and copying permission information is included in the copying control information.

The control unit 1 determines whether decoding of all pieces of the embedded information is completed (S509).

When the control unit 1 determines that decoding of all pieces of the embedded information is not completed yet in step S509, the process returns to processing of step S508.

When the control unit 1 determines that decoding of all pieces of the embedded information is completed in step S509, the control unit 1 determines whether copying prohibition information is included in the copying control information (S510).

When the control unit 1 determines that copying prohibition information is included in the copying control information in step S510, the control unit 1 stops the copying operation of the MFP 1001. That is, the document image generated by the reading unit 2 is not copied.

When the control unit 1 determines that copying prohibition information is not included in the copying control information in step S510, the control unit 1 acquires the printing security setting (S510). Then, the control unit 1 acquires the copying control information to be embedded in the QR code and the position of the QR code to be printed on the document (S511).

Next, the control unit 1 determines whether addition of QR code is set in the printing security setting (S512).

When the control unit 1 determines that addition of QR code is set in the printing security setting in step S512, the control unit 1 determines whether one or more copying control QR codes are decoded (S513).

When the control unit 1 determines that addition of QR code is not set in the printing security setting in step S512, the MFP 1001 starts printing processing (S519).

When the control unit 1 determines that one or more copying control QR codes are decoded in step S513, the copying control QR code is set to a QR code to be updated (S514). In the present embodiment, the QR code to be updated is referred to as an "update target QR code".

The control unit 1 newly generates image data of a QR code from the embedded information obtained from the update target QR code, the printing security setting, and the information of the MFP 1001. In the present embodiment, the embedded information of a QR code is generated and the image data of the QR code is generated based on first user information obtained from the update target QR code, the copying control information obtained from the printing security setting, and the final user information obtained from the information of the MFP 1001.

The control unit 1 overwrites and adds the image data of the QR code generated in step S515 in the position of the update target QR code in the image data to be printed (S516). Then, the process proceeds to step S519.

When the control unit 1 determines that one or more copying control QR codes are not decoded in step S513, the control unit 1 generates a QR code based on the copying control information obtained from the printing security setting and the final user information obtained from the information of the MFP 1001 (S517).

The control unit 1 overwrites and adds the image data of the QR code generated in step S517 in the QR code printing position obtained from the acquired printing security setting (S518). Then, the process proceeds to step S519.

Next, the MFP 1001 starts copying of the document image (S519).

Next, in step S520, the control unit 1 determines whether or not the number of remaining sheets of documents to be scanned by the reading unit 2 is one or more.

When it is determined that the number of the remaining sheets of documents to be scanned by the reading unit 2 is one or more in step S520, the process returns to the processing of S502.

When it is determined that the number of the remaining sheets of documents to be scanned by the reading unit 2 is not one or more in step S520, the processing is completed.

When the control unit 1 determines that the number of counted pieces of embedded information is equal to or larger than the specified number in step S507, the control unit 1 stops the copying operation of the MFP 1001. That is, the document image generated by the reading unit 2 is not copied.

By the above process, it is made possible to prevent the MFP from performing unauthorized operation even if a malicious user scans, at a time, a number of the copying control QR codes including control information of the copying operation and a number of the two-dimensional codes of the same kind but not having control information of the copying operation.

As described above, in the first embodiment, when the MFP 1001 having the copying prohibition function converts both the QR code having control information of the copying operation and the QR code having information other than the control information into pieces of information in the number equal to or larger than the specified number, copying is prohibited. Further, copying is prohibited regardless of whichever information is included in the copying control information.

By this control, it is made possible to make an arrangement to prevent unauthorized copying from being performed with regard to copying of a document to which the two-dimensional code including the control information of the copying operation and the two-dimensional code of the same kind and including quite different information but not including the control information of the copying operation are added.

Second Embodiment

Next, in a second embodiment of the present invention, control when the copying control QR code includes information about the version and revision in addition to that in the first embodiment is explained. The version and revision are information that is included together with the copying control information of the copying control QR code, the tracking information, and the embedded information of the copying control format identifier. In the present embodiment, the version and the revision are referred to as a "copying control format version" and a "copying control format revision", respectively.

First, the "copying control format version" and the "copying control format revision" are explained specifically. The copying control format version and the copying control format revision in the present embodiment are information for specifying the specifications of a two-dimensional code and also used to manage and identify the arrangement of the data in the obtained embedded information.

As a QR code used in the present embodiment, information about, such as the version indicating information of the module size of a two-dimensional code, an error correction level, and the mode indicating binary data and character code, is used generally in order to convert the two-dimensional code into information.

The copying control format version and the copying control format revision are different from such information as described above and are used to interpret information on the data included in the embedded information.

For example, when to the function of the copying control QR code used in a MFP, a function is added in another MFP in the future and as a result of that, the kind of information and the amount of information to be embedded in a next-generation copying control QR code are changed, the version and/or the revision of the next-generation copying control QR code are incremented.

In the present embodiment, it is assumed that the order of arrangement and the size of the data in which embedded information is stored are the same in any of the copying control format version and the copying control format revision. The reason is as follows. If the arrangement and the size of the data of the information are different, it is not possible for the current MFP to determine whether the QR code that is read is a copying control QR code, and therefore, it is not possible to determine because the version and the revision of the copying control QR code are not supported.

The difference between the copying control format version and the copying control format revision lies in that it is not possible for the copying control format version to guarantee the interpretation of embedded information (recognition of information) by the current MFP when the version is incremented.

For example, when the arrangement of the data of copying control information and tracking information is changed or conditional information (password information) other than the copying permission information and copying prohibition information is defined in the copying control information, the copying control format version is incremented in the present embodiment.

On the other hand, it is assumed that the copying control format revision guarantees to enable interpretation as long as the embedded information belongs to an item that is already supported by the current MFP even if the revision is incremented.

For example, when anew item of tracking information is added to the end of the data of tracking information, it is possible for the current MFP to interpret the embedded information of the copying control QR code before the item is added, and therefore, the copying control format revision is incremented.

Next, the processing according to the second embodiment of the present invention is explained, in particular, points different from those in the first embodiment are explained mainly.

In the first embodiment, when the total number of the copying control QR codes and the general information QR codes included in one page is equal to or greater than the specified number, the target document image is not copied.

In the second embodiment, when the total number of copying control QR codes and general information QR codes is smaller than the specified number and there are two or more copying control QR codes, it is determined which copying control QR code is set to the update target QR code.

For example, the present second embodiment relates to processing when there are two or more copying control QR codes with different copying control format versions within a document image and the copying control format version of one or more copying control QR codes is not supported by the MFP that extracts embedded information. However, in such a case, it is not possible for the MFP to determine whether the information included in the copying control information is copying permission information or copying prohibition information because the copying control format version is different. Because of this, in the present embodiment, when a copying control format version that is not supported is extracted, copying is prohibited regardless of the contents of the copying control information. This is the same in a case where documents to which a copying control QR code having both a copying control format version that is supported and copying permission information is added are read at the same time.

The reason is that there is a possibility that the copying control QR code of the copying control format version that is not supported includes copying prohibition information, and therefore, control for greater safety in security is performed.

Similarly, there is a case where there are two or more copying control QR codes with different copying control format revisions and the revision of one or more of the copying control QR codes is not supported by the MFP that extracts embedded information.

Even if the revisions are different, it is possible for the MFP to recognize items that is supported and copying control information.

Because of this, in the present embodiment, when a copying control format revision that is not supported is extracted, if the copying control information is the same, the copying control QR code of the more recent revision is set to the update target QR code.

The reason is that it is supposed that the more recent copying control format revision has a larger amount of information, such as tracking information, because of being the next-generation copying control QR code. Consequently, when the copying control information is the same, the copying control QR code of the copying control format revision expected to have a larger amount of information is set to the update target QR code and thus embedded information is taken over.

In the present embodiment, it is assumed that the copying control format version and the copying control format revision are automatically included in the embedded information of the QR code when addition of QR code is set in the printing security setting.

Next, control of the copying operation performed by the MFP 1001 having the function to prevent unauthorized copying in the second embodiment of the present invention is explained in detail with reference to FIGS. 6A-6D.

In this control, the processing of steps S504 and S514 in the flowchart shown in FIGS. 5A-5C is replaced with processing of steps S605 and S614 and further, processing of steps of S621 to 628 is added.

Hereinafter, parts to which changed from those in the first embodiment are explained. The control to prohibit output when a document to which copying prohibition information is added is read and the control to stop the copying operation when pieces of embedded information in the number equal to or larger than the specified number are received are the same as in the first embodiment.

The control unit 1 determines whether decoding of all the embedded information is completed (S609)

When determining that decoding of all the embedded information is completed in step S609 (S609; YES), the control unit 1 determines whether one or more pieces of copying control format version that is not supported by the MFP 1001 are extracted (S621).

When the control unit 1 determines that one or more pieces of the copying control format version information that is not supported by the MFP 1001 are extracted in the embedded information in step S621, the control unit 1 stops the copying operation of the MFP 1001. That is, the document image generated by the reading unit 2 is not copied.

If the copying control format version is different, there is a possibility that it is not possible to interpret the copying control information correctly because the arrangement, size, and kind of the copying control format identifier, the copying control format version, and information other than the copying control format revision are changed. If copying is performed, there is a case where a document to which a QR code in which copying prohibition information is embedded is printed. Because of this, in the present embodiment, when the copying control format version is different, the copying operation of the document is stopped.

Similarly, even when a copying control QR code the copying control format version of which is supported by the MFP 1001 and the copying control information of which can be interpreted, and a copying control QR code of the copying control format version that is not supported are read at the same time, the copying operation is stopped because of the reason described above.

When the control unit 1 determines that no copying control format version information that is not supported by the MFP 1001 is extracted in the embedded information in step S621, the control unit 1 determines whether copying prohibition information is included in the copying control information (S610).

Step S610 to step S613 are the same as those in the first embodiment, and therefore, their description is omitted.

When the control unit 1 determines that one or more copying control QR codes are decoded in step S613, the control unit 1 determines whether the two or more oldest dates of copying exist in the first user information of the embedded information (S622).

When the control unit 1 determines the two or more oldest dates of copying do not exist in the first user information of the embedded information in S622, the copying control QR code having the embedded information of the first user information of the oldest date of copying is set to the update target QR code (S623). Then, the process proceeds to step S615. The reason the copying control QR code in which the oldest date of copying is included is set to the update target QR code is that it is intended to preserve information about the user who has first added the copying control QR code to the document.

When determining that the two or more oldest dates of copying exist in the first user information (S622), the control unit 1 determines whether two or more copying control QR codes including the same latest copying control format revision are detected in the corresponding embedded information (S624).

When the control unit 1 determines that the two or more copying control QR codes including the latest copying control format revision do not exist in step S624, the copying control QR code of the latest copying control format revision is set to the update target QR code (S625).

The processing is performed as described above because there is a possibility that the copying control QR code the copying control format revision of which is more recent has a larger amount of information included in the tracking information than the copying control QR code the copying control format revision of which is older. Then, when the two or more latest dates of copying exist, the embedded information the copying control format revision of which is more recent is adopted.

When the control unit 1 determines that the two ore more copying control QR codes including the latest copying control format revision exist in step S624, a user-specified value indicating which copying control QR code is set to the update target QR code is acquired (S626). Next, the process proceeds to step S614.

In the present embodiment, it is assumed that the processing of S626 is performed in such a manner that a UI (not shown schematically here) with which to make a user select a position of the update target QR code is displayed on the display unit 9 and a value is determined by making the user input via the operation unit 5.

However, when a QR code printing position given preference in advance in the printing security setting is specified and if the MFP 1001 has a default position of the update target QR code in advance, there can be supposed a case where the copying control QR code that the MFP 1001 has first extracted is set to the update target QR code. However, in the present invention, this is not limited in particular.

In step S614, the specified copying control QR code is set to the update target QR code and next, the process proceeds to step S615.

Steps S615 and S616 and steps S617 and S618 are the same as those in the first embodiment, and therefore, their description is omitted. After the processing of step S616 or step S618, the process proceeds to step S627.

The control unit 1 determines whether two or more pieces of embedded information having the copying control format identifier are extracted in step S627.

When the control unit 1 determines that two or more pieces of embedded information having the copying control format identifier are extracted in step S627, all the images of the QR code having the copying control format identifier that are not overwritten are deleted from the read document image (S628). Here, the deletion is processing to prohibit the copying control QR code from being read from the document image and in the present embodiment, the processing is to whiten the copying control QR code. However, it may also be possible to replace the color with the background color, to blacken the copying control QR code, or to replace the copying control QR code with another image, and this is not limited in particular.

In the processing of step S627, when there are two or more QR codes having the copying control format identifier, it is not possible to determine which copying control QR code is specified to be updated by a user only viewing the document, and therefore, deletion is performed to avoid ambiguity.

In the present embodiment, even if the embedded information of the general information QR code not having the copying control format identifier is obtained at the same time, the general information QR code is not deleted from the document because it is not possible to determine whether the general information QR code is a QR code that can be deleted.

When the control unit 1 determines that two or more pieces of embedded information having the copying control format identifier are not extracted in step S627, the control unit 1 proceeds to step S619.

The above is the invention relating to the control when the MFP 1001 having the copying prohibition function converts the copying control QR code including information of the version and revision and the QR code having information other than the information of the version and revision into pieces of information in the number equal to or larger than the specified number, respectively, in a document to be scanned.

By this control, it is made possible to perform control that does not cause malfunction even when a plurality of copying control QR codes including information of the different versions or revisions and a two-dimensional code not including the control information of the copying operation are read mixedly at a time.

Third Embodiment

Next, a third embodiment of the present invention is explained. In the third embodiment, control when there exists a setting to forcedly permit copying even if copying prohibition information is included in the copying control QR code when a QR code is detected is explained. In the third embodiment, it is assumed that the setting of the MFP to forcedly perform copying as described above is referred to as a "prohibition information ignoring mode".

When the setting of the prohibition information ignoring mode is enabled, it is possible to copy a document image to which the copying control QR code of copying prohibition information is added. It is intended that the prohibition information ignoring mode is used only when, for example, a user who has the right of the administrator of the MFP or the right to handle confidential information desires to temporarily copy a document including copying prohibition information by changing the setting.

In the second embodiment, when the copying control format version is the copying control QR code that is not supported by the MFP that has read it, copying is prohibited.

However, there can be considered a case where a user who has the right of the administrator or the right to handle confidential information desires to copy even a document to which the copying control QR code including the copying control format version that is not supported is added.

Because of the above, in the third embodiment, when the setting of the prohibition information ignoring mode is enabled, even if the embedded information of the copying control format version that is not supported is obtained, control to permit copying is performed. By performing control in this manner, it is possible for a user who has the right of the administrator or the right to handle confidential information to temporarily copy even a document to which the copying control QR code including the copying control format version that is not supported by the MFP is added, and therefore, convenience is improved.

In the present embodiment, the setting of the prohibition information ignoring mode is displayed on the display unit 9 (here, not shown schematically) and a user inputs the setting via the operation unit 5. Further, in the present embodiment, it is assumed that the prohibition information ignoring mode is a mode that can be set only by a user who has the right of the administrator of the MFP 1001. However, this is not limited in particular in the present invention.

Even when the setting of the prohibition information ignoring mode is disabled, it is made possible for a user to set addition of the copying control QR code by specifying the printing security setting from the operation unit 5. However, in the present embodiment, it is intended that when a document including copying prohibition information is copied, if addition of the QR code of copying permission information is set, it is not possible to replace the copying prohibition information with copying permission information. Consequently, even if addition of copying prohibition information is set, the document is output with the copying prohibition information included or the output itself of the document is aborted as a result.

The reason for this is that it is intended to prevent the security strength of a confidential document prohibited to be copied from dwindling.

Control of the copying operation performed by the MFP 1001 having the function to prevent unauthorized copying in the third embodiment of the present invention is explained in detail with reference to FIGS. 7A-7E.

Here, parts different from those in the second embodiment of the present invention are explained.

In this control, processing of steps S729 to S736 is added to the flowchart shown in FIGS. 6A-6D.

Hereinafter, parts to which changed from those in the second embodiment are explained. The control to prohibit output when a document to which one or more copying control QR codes are added is read is the same as that in the first embodiment and/or the second embodiment.

When the control unit 1 determines that one or more pieces of copying control format version information that is not supported by the MFP 1001 are extracted in the embedded information in step S721, the control unit 1 determines whether the prohibition information ignoring mode of the MFP 1001 is enabled (S729).

When determining that no copying control format version information that is not supported by the MFP 1001 is extracted in the embedded information in step S721, the control unit 1 determines whether one or more pieces of copying prohibition information are extracted (S710).

When the control unit 1 determines that one or more pieces of copying prohibition information are extracted in the embedded information in step S710, the control unit 1 determines whether the prohibition information ignoring mode of the MFP 1001 is enabled (S729).

When the control unit 1 determines that no copying prohibition information is extracted in the embedded information in step S710, the control unit 1 proceeds to step S711.

When the control unit 1 determines that the prohibition information ignoring mode of the MFP 1001 is not enabled in step S729, the control unit 1 stops the copying operation of the MFP 1001. That is, the document image generated by the reading unit 2 is not copied. This is the same operation as that when embedded information of the copying control format version that is not supported or copying new information is obtained in the first embodiment and the second embodiment described above.

When the control unit 1 determines that the prohibition information ignoring mode of the MFP 1001 is enabled in step S729, the control unit 1 acquires the printing security setting (S730). Then, the process proceeds to step S731.

In step S731, the control unit 1 determines whether addition of the copying control QR code is set in the printing security setting.

When the control unit 1 determines that addition of copying control QR code is not set in the printing security setting in step S731, the MFP 1001 starts copying of the document image (S719).

When the control unit 1 determines that addition of copying control QR code is set in the printing security setting in step S731, the control unit 1 determines whether the two or more latest copying control format versions exist in the obtained embedded information (S732).

When the control unit 1 determines that the two or more latest copying control format versions do not exist in the obtained embedded information in step S732, that is, when the number of the latest copying control format versions is one, the process proceeds to step S733.

In step S733, the control unit 1 sets the copying control QR code of the latest copying control format version to the update target QR code. Then, the process proceeds to step S715.

When the control unit 1 determines that the two or more latest copying control format versions exist in the obtained embedded information in step S732, the control unit 1 determines whether two or more pieces of copying prohibition information are extracted in the corresponding embedded information (S734).

When the control unit 1 determines that two or more pieces of copying prohibition information are extracted in the corresponding embedded information in S734, the process proceeds to step S722. That is, the processing to set the update target QR code is performed as in the first embodiment and the second embodiment.

When the control unit 1 determines that two or more pieces of copying prohibition information are not extracted in the corresponding embedded information in step S734, the control unit 1 determines whether the copying prohibition information exists in the corresponding embedded information (S735).

When the control unit 1 determines that the copying prohibition information does not exist in the corresponding embedded information in S735, the process proceeds to step S722. That is, all the copying control QR codes are permitted, and therefore, the processing to set the update target QR code is performed as in the first embodiment and the second embodiment.

When the control unit 1 determines that the copying prohibition information exists in the corresponding embedded information in S735, the copying control QR code having the copying prohibition information is set to the update target QR code (S736). Then, the process proceeds to step S715.

As described above, in the present embodiment, when the prohibition information ignoring mode is enabled, the document to which not only copying prohibition information but also the copying control QR code including the copying control format version that is not supported is added is permitted to be printed for convenience. Further, when the printing security setting is enabled in the printing, overwrite of the copying control QR code is also enabled.

The above is the invention relating to the control when the MFP having the copying prohibition function converts the QR code having the control information of the copying operation including the version and revision and other QR codes into pieces of information in the number equal to or larger than the specified number, respectively, in a document to be scanned in the prohibition information ignoring mode.

By this control, when the prohibition information ignoring mode is enabled, it is made possible to copy a document to which not only copying prohibition information but also a copying control QR code including the copying control format version that is not supported is added, and therefore, it is possible to improve convenience.

Fourth Embodiment

Next, a fourth embodiment of the present invention is explained. In the second embodiment and third embodiment, as the condition of setting the update target QR code, the date of copying is set in preference to the copying control format revision. For example, it is assumed that two copying control QR codes having the same copying control format version and the same copying control information are read. In this case, of the two copying control QR codes, the copying control QR code of which the date of copying of the first user information of the embedded information is older is set to the update target QR code. The reason is that it is intended to preserve information about the user who has first added the copying control QR code to the document. Further, when the date of copying of the first user information is the same, one with the more recent copying control format version is adopted. The reason is that there is a possibility that one with the more recent copying control format version has a larger amount of embedded information than older one.

However, there can also be supposed a case where it is intended to preserve the copying control format revision in preference to the first user information because the amount of information of the data of the embedded information of the more recent copying control format revision is larger than that of the embedded information of the older copying control format revision.

So in the present fourth embodiment, when the update target QR code is set from among a plurality of copying control QR codes, preference is given to the copying control format revision to the date of copying of the first user information and the copying control QR code having the more recent copying control format revision is set to the update target QR code.

As to the control of the fourth embodiment and the control of the second embodiment or the third embodiment, it may also be possible to allow a user, such as an administrator, to change the set value in addition to the MFP 1001 having the setting of which is given preference as the default value. For example, a UI (not shown schematically here) is displayed on the display unit 9, in which an item is selected from "One with the oldest first user information" and "Copying control format revision", which is given preference when the update target QR code is set. Then, a user is caused to input via the operation unit 5.

Control of the copying operation performed by the MFP 1001 having the function to prevent unauthorized copying in the fourth embodiment of the present invention is explained in detail with reference to FIGS. 8A-8E.

Here, parts different from those in the third embodiment of the present invention are explained.

In this control, the order of processing of steps S722 and S724, and step S723 and S725 in the flowchart shown in FIGS. 7C-7D are exchanged, respectively.

Hereinafter, parts to which changed from those in the third embodiment are explained. The control to prohibit output when a document to which one or more copying control QR codes are added is read and the control when the prohibition information ignoring mode is enabled are the same as those of the third embodiment.

When determining that one or more copying control QR codes are decoded in step S813, the control unit 1 determines whether the two or more copying control QR codes including the latest copying control format revision exist in the corresponding embedded information (S824).

When the control unit 1 determines that the two or more copying control QR codes including the latest copying control format revision do not exist in step S824, the copying control QR code of the latest copying control format revision is set to the update target QR code (S825). Next, the process proceeds to step S815.

When determining that the two or more copying control QR codes including the latest copying control format revision exist in step S824, the control unit 1 determines whether the two or more oldest dates of copying exist in the first user information of the embedded information (S822).

When the control unit 1 determines that the two or more oldest dates of copying exist in the first user information of the embedded information in S822, the user-specified value indicating which copying control QR code is set to the update target QR code is acquired (S826). Next, the process proceeds to step S814.

When the control unit 1 determines that the two or more oldest dates of copying do not exist in the first user information of the embedded information in step S822, the copying control QR code having the oldest date of copying in the first user information of the embedded information is set to the update target QR code (S823). Next, the process proceeds to step S815.

As described above, when two copying control QR codes having the same copying control format version and the same copying control information are read, the copying control QR code including the more recent copying control format revision is set to the update target QR code preferentially. Due to this, it is made possible to take over the embedded information of the more recent copying control format revision.

Fifth Embodiment

In the second embodiment, when the copying control format version that is not supported is extracted, copying is prohibited as the safe control in security whether or not which copying control information is included actually.

However, there can also be considered a case where when the copying control QR code including the copying control format version that is supported is extracted in the same document, the copying control information of the copying control format version that is supported is observed as a result of taking convenience into consideration.

The fifth embodiment relates to control to give preference to the copying control information of the copying control format version that is supported when the copying control QR code of the copying control format version that is supported and that of the copying control format version that is not supported are read at the same time.

As to the control of the fifth embodiment and the control of the second embodiment to the fourth embodiment, it may also be possible to allow a user, such as an administrator, to change the set value in addition to the MFP 1001 having the setting of which is given preference as the default value. For example, a UI (not shown schematically here) is displayed on the display unit 9, in which an item is selected from "One with the oldest first user information" and "Copying control format revision", which is given preference when the update target QR code is set. Then, a user is caused to input via the operation unit 5.

Next, control of the copying operation performed by the MFP 1001 having the function to prevent unauthorized copying in the fifth embodiment of the present invention is explained in detail with reference to FIGS. 9A-9D.

Here, parts different from those in the second embodiment of the present invention are explained.

Figure 6B:
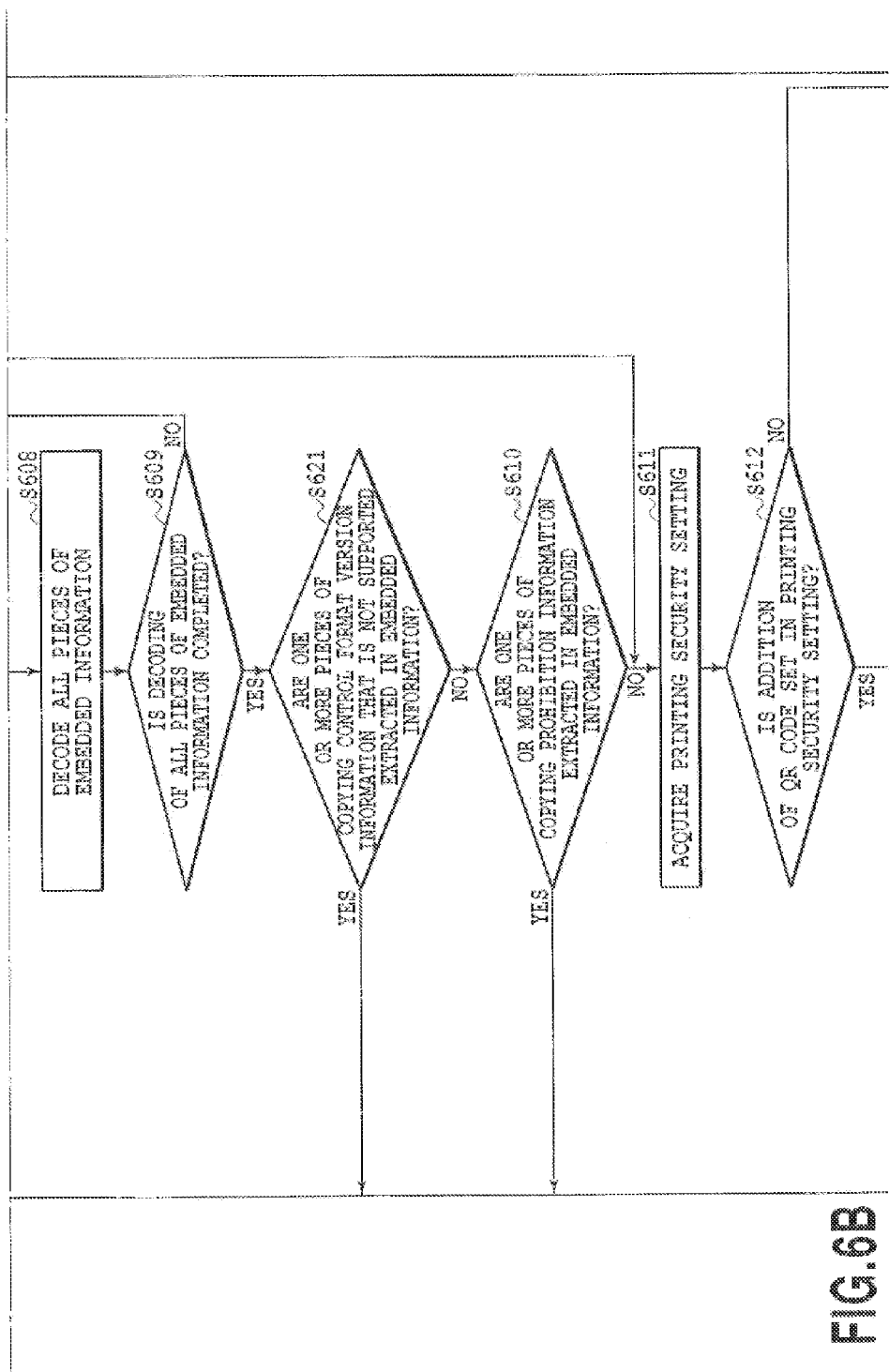
Figure 6C:
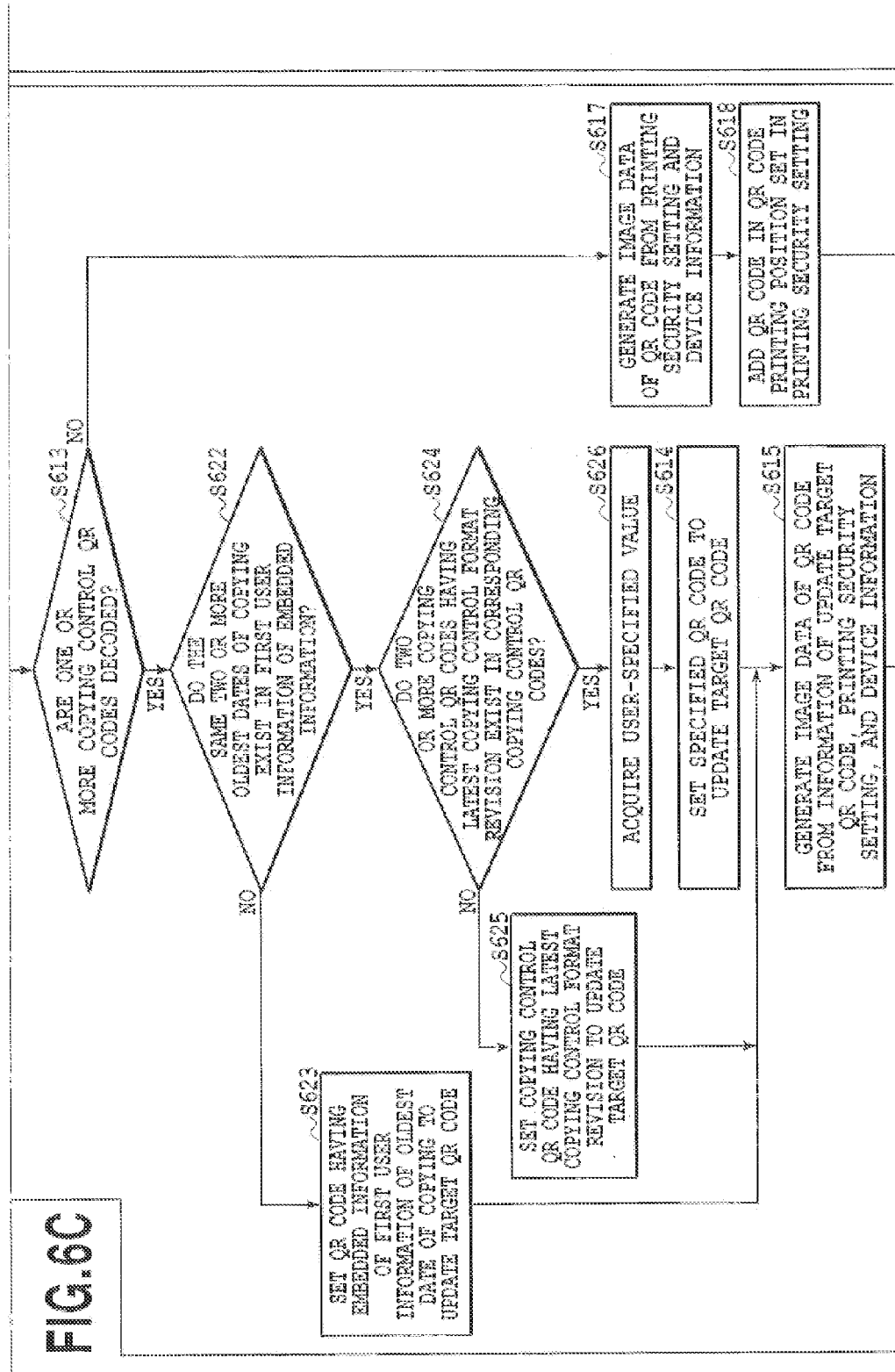
Figure 6D:
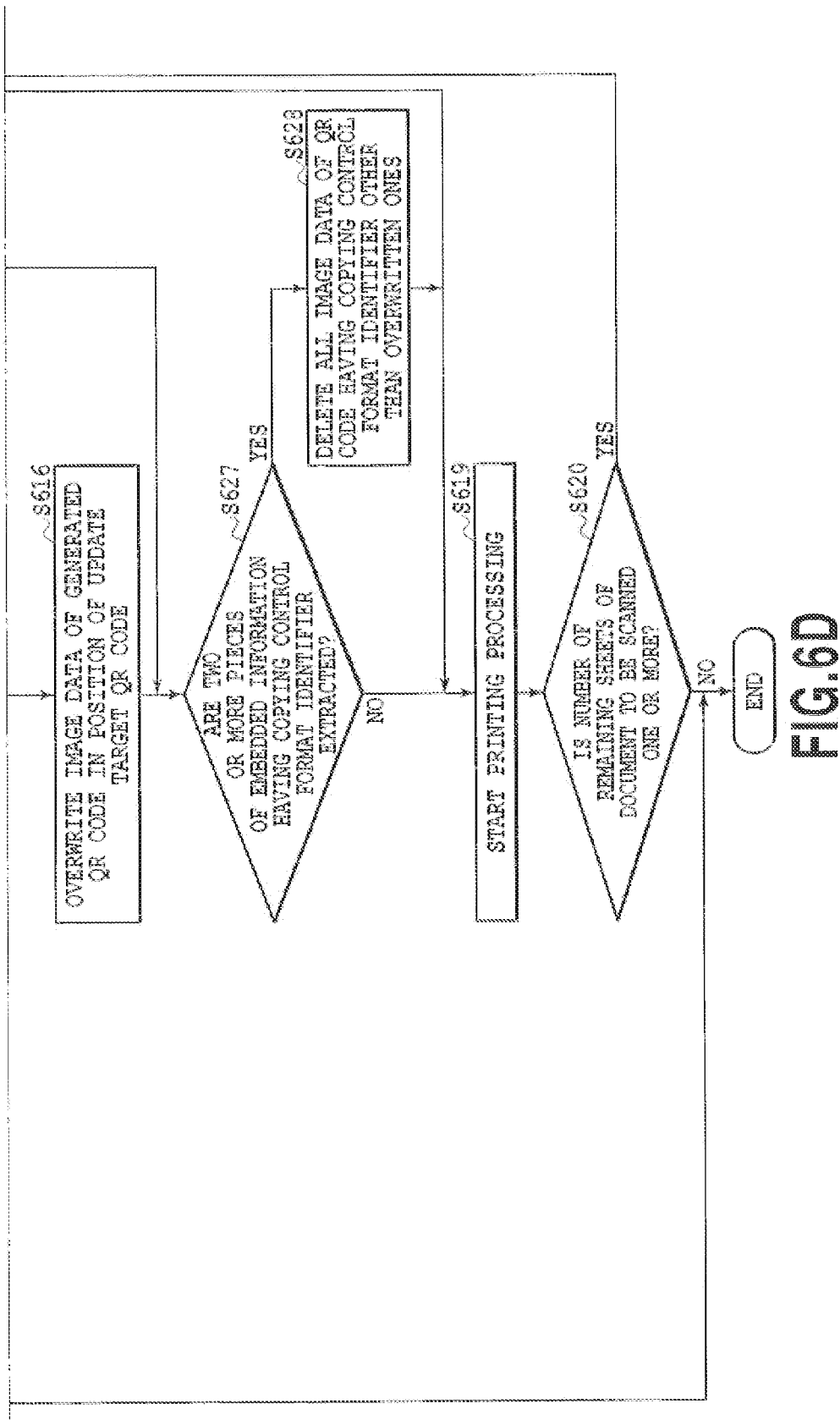
Figure 7B:
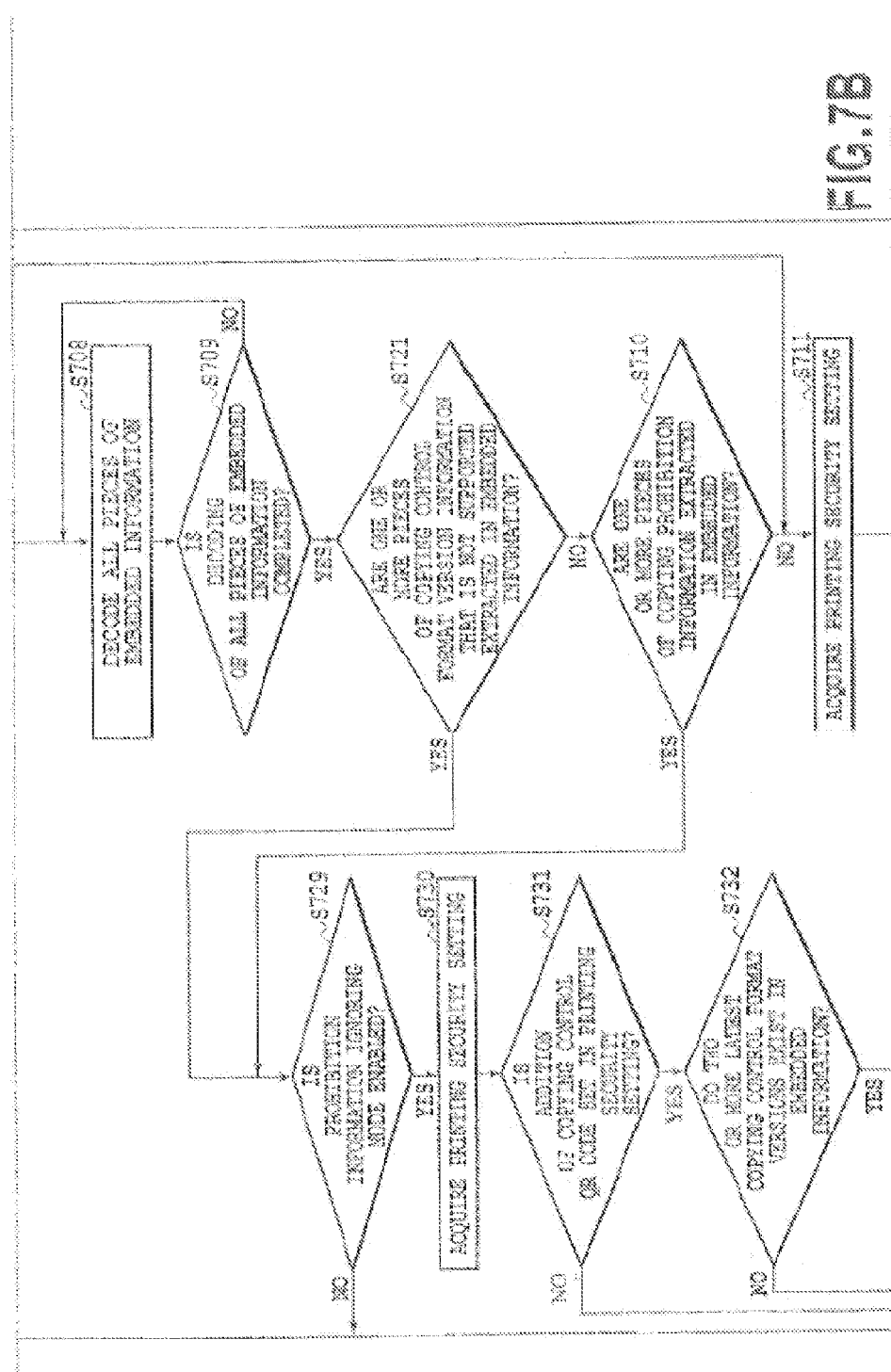
Figure 8B:
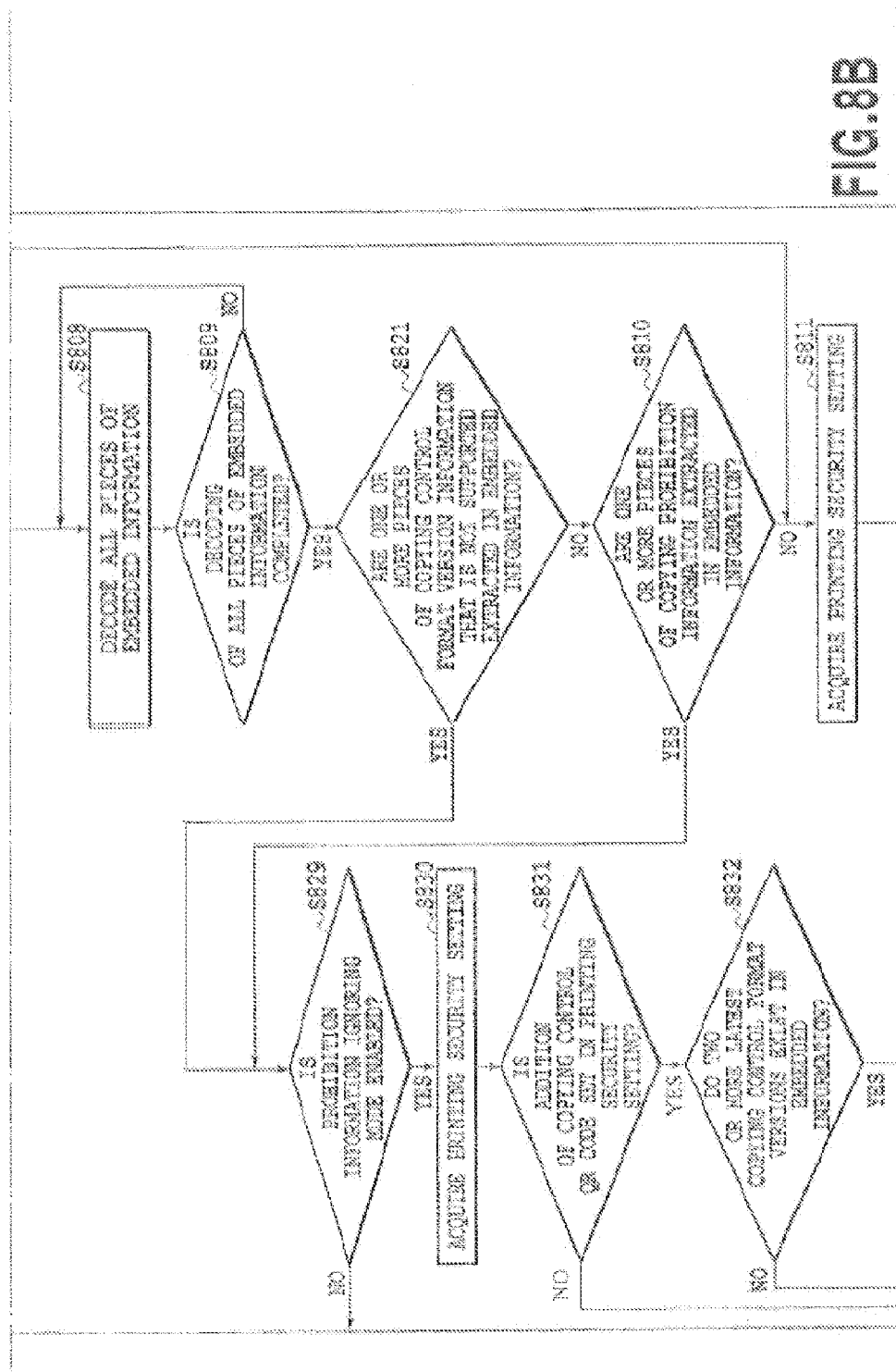
Figure 8E:
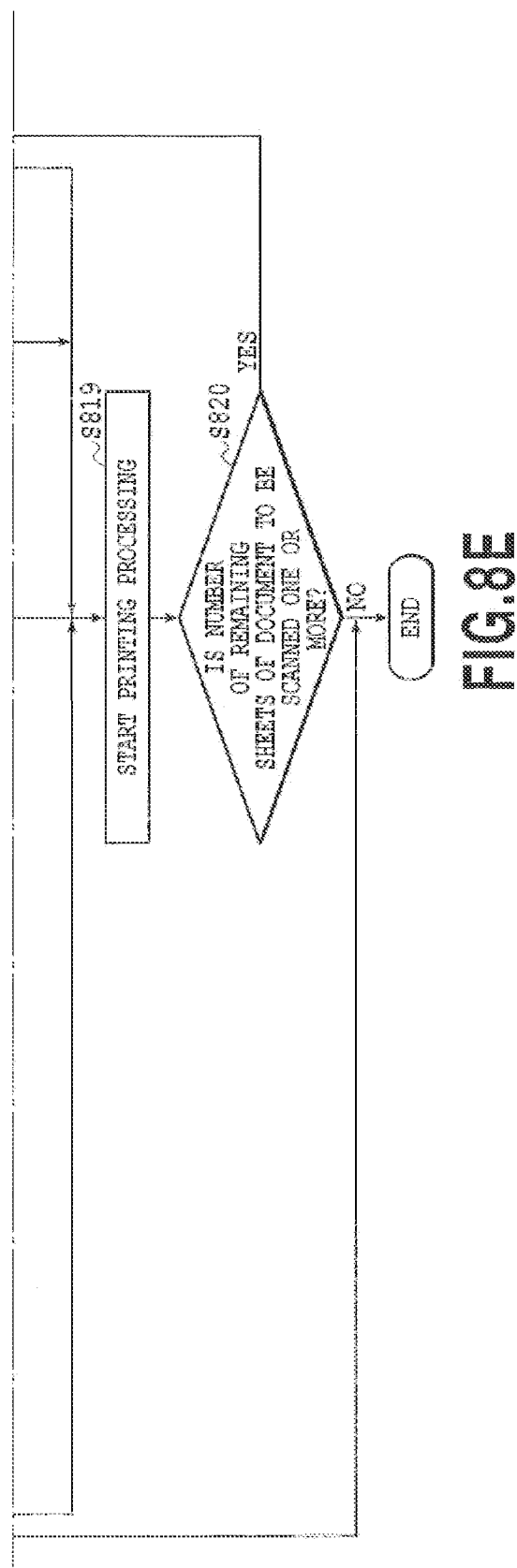
Figure 9B:
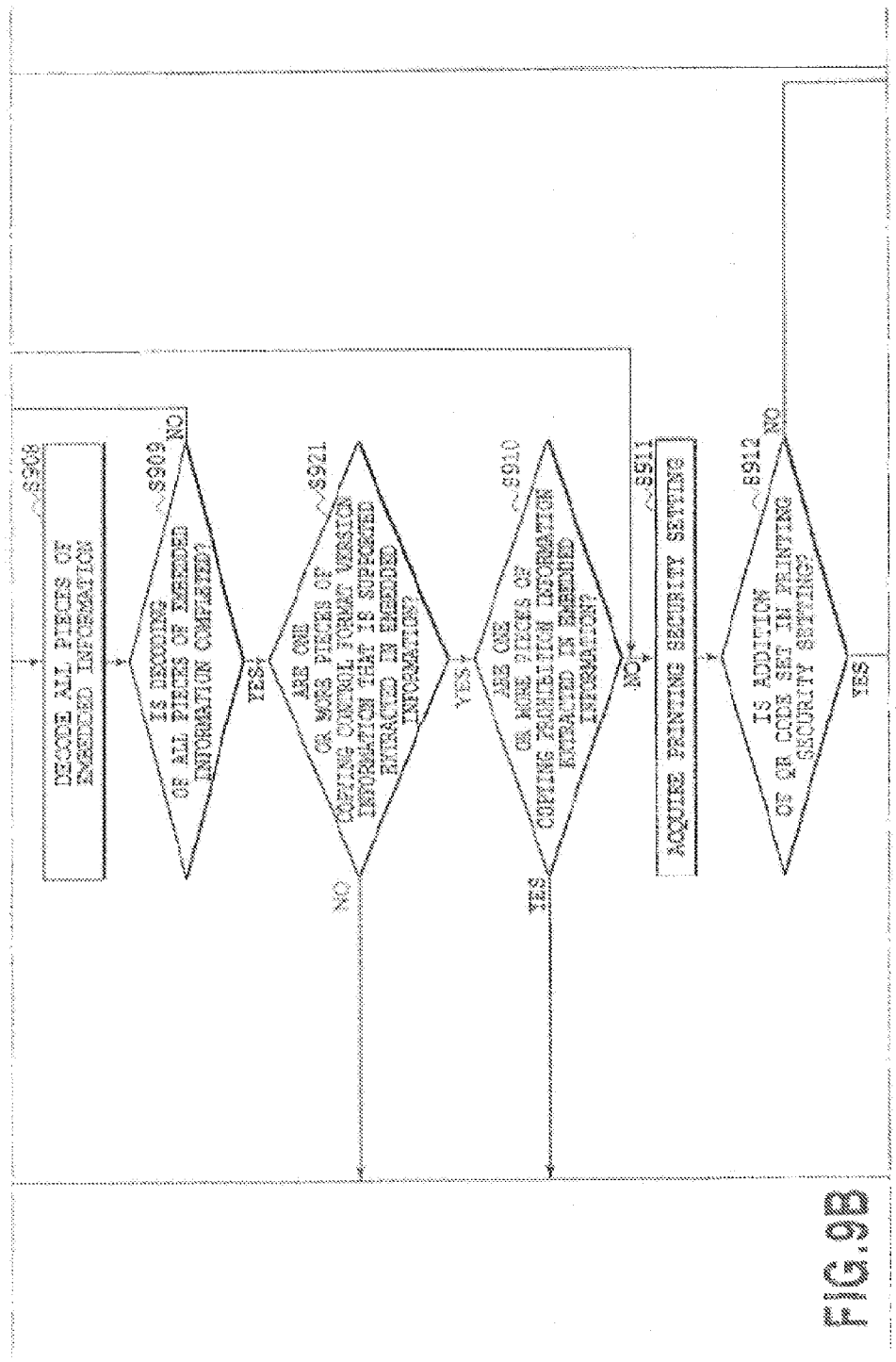

In this control, the processing of step S621 in the flowchart shown in FIG. 6B is modified.

When the control unit 1 determines that decoding of all pieces of the embedded information is completed in step S909, the control unit 1 determines whether one or more pieces of copying control format version information that is supported by the MFP 1001 are extracted in the embedded information (S921).

When the control unit 1 determines that no copying control format version information that is supported by the MFP 1001 is extracted in step S921, the control unit 1 stops the copying operation of the MFP 1001. That is, the document image generated by the reading unit 2 is not copied. This is the operation when all pieces of the extracted copying control format version information is not supported and the processing is the same as that when one or more pieces of copying control format version information that is not supported are extracted in the second embodiment to the fourth embodiment.

When the control unit 1 determines that one or more pieces of copying control format version information that is supported by the MFP 1001 are extracted in S921, the control unit 1 determines whether copying prohibition information is included in the copying control information (S910). That is, when at least one piece of the extracted copying control format version information is supported, processing is performed based on the copying control information of the copying control QR code.

As described above, in the present embodiment, the case is supposed where the copying control QR code of the copying control format version that is supported and that of the copying control format version that is not supported are read at the same time. Then, when at least one piece of copying control format version that is supported is included, preference is given to the copying control information of the copying control QR code, and thus, it is made possible to improve convenience.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Continuation of U.S. application Ser. No. 13/483,341, filed on May 30, 2012, which claims the benefit of Japanese Patent Application No. 2011-128396, filed Jun. 8, 2011, which are hereby incorporated by reference herein in their entirety.

What is claimed is:

1. A printing apparatus comprising:
an input unit configured to input an image;
a detecting unit configured to detect a two-dimensional code in the input image;
a determining unit configured to determine whether a version which is included in the detected two-dimensional code is a compliant version of the printing apparatus;

a replacing unit configured to replace the detected two-dimensional code with a new two-dimensional code in the input image; and a printing unit configured not to print in a case that the version which is included in the detected two-dimensional code is determined not to be a compliant version of the printing apparatus, and configured to print the input image in which the detected two-dimensional code has been replaced with a new two-dimensional code in a case that the version which is included in the detected two-dimensional code is determined to be a compliant version of the printing apparatus.

2. The printing apparatus according to claim 1, wherein the detected two-dimensional code includes information other than the version, and the version indicates arrangement of the information in the detected two-dimensional code.

3. The printing apparatus according to claim 1, further comprising:

a unit configured to determine whether copying control information included in the detected two-dimensional code indicates copying prohibition;

wherein the printing unit is configured to print the input image in which the detected two-dimensional code has been replaced with a new two-dimensional code in a case that the version included in the detected two-dimensional code is determined to be a compliant version of the printing apparatus and copying control information included in the detected two-dimensional code is determined not to indicate copying prohibition.

4. The printing apparatus according to claim 3, wherein the determination as to whether copying control information included in the detected two-dimensional code indicates copying prohibition is performed in a case that the version included in the detected two-dimensional code is determined to be a compliant version of the printing apparatus, and the determination as to whether copying control information included in the two-dimensional code indicates copying prohibition is not performed in a case that the version included in the two-dimensional code is determined not to be a compliant version of the printing apparatus.

5. The printing apparatus according to claim 3, wherein the printing unit is configured not to print in a case that the version included in the detected two-dimensional code is determined to be a compliant version of the printing apparatus and copying control information included in the detected two-dimensional code is determined to indicate copying prohibition.

6. A printing method for controlling a printing apparatus having a printing unit, said method comprising the steps of:

inputting an image;

detecting a two-dimensional code in the input image;

determining whether a version which is included in the detected two-dimensional code is a compliant version of the printing apparatus;

replacing the detected two-dimensional code with a new two-dimensional code in the input image; and controlling the printing unit not to print in a case where the version which is included in the detected two-dimensional code is determined not to be a compliant version of the printing apparatus, and to print the input image in which the detected two-dimensional code has been replaced with a new two-dimensional code in a case that the version which is included in the detected two-dimensional code is determined to be a compliant version of the printing apparatus.

7. The printing method according to claim 6, wherein the detected two-dimensional code includes information other than the version, and the version indicates arrangement of the information in the detected two-dimensional code.

8. The printing method according to claim 6, further comprising:

determining whether copying control information included in the detected two-dimensional code indicates copying prohibition;

wherein the controlling step controls the printing unit to print the input image in which the detected two-dimensional code has been replaced with a new two-dimensional code in a case that the version included in the detected two-dimensional code is determined to be a compliant version of the printing apparatus and copying control information included in the detected two-dimensional code is determined not to indicate copying prohibition.

9. The printing method according to claim 8, wherein the step of determining whether copying control information included in the detected two-dimensional code indicates copying prohibition is performed in a case that the version included in the detected two-dimensional code is determined to be a compliant version of the printing apparatus, and the step of determining whether copying control information included in the detected two-dimensional code indicates copying prohibition is not performed in a case that the version included in the detected two-dimensional code is determined not to be a compliant version of the printing apparatus.

10. The printing method according to claim 8, wherein the controlling step controls the printing unit not to print in a case that the version included in the detected two-dimensional code is determined to be a compliant version of the printing apparatus and copying control information included in the detected two-dimensional code is determined to indicate copying prohibition.

11. A non-transitory computer-readable storage medium storing a program for causing a printing apparatus having a printing unit to perform a printing method, the printing method comprising the steps of:

inputting an image;

detecting a two-dimensional code in the input image;

determining whether a version which is included in the detected two-dimensional code is a compliant version of the printing apparatus;

replacing the detected two-dimensional code with a new two-dimensional code in the input image; and controlling the printing unit not to print in a case where the version which is included in the detected two-dimensional code is determined not to be a compliant version of the printing apparatus, and to print the input image in which the detected two-dimensional code has been replaced with a new two-dimensional code in a case that the version which is included in the detected two-dimensional code is determined to be a compliant version of the printing apparatus.

\* \* \* \* \*